United States Patent
Fox et al.

(10) Patent No.: US 11,390,375 B2
(45) Date of Patent: Jul. 19, 2022

(54) CONTROL SURFACE ACTUATOR ASSEMBLIES, AIRCRAFT HYDRAULIC SYSTEMS INCLUDING THE SAME, AND ASSOCIATED AIRCRAFT AND METHODS

(71) Applicant: The Boeing Company, Chicago, IL (US)

(72) Inventors: Michael Thomas Fox, Saint Charles, MO (US); Jeffrey M. Roach, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 16/811,979

(22) Filed: Mar. 6, 2020

(65) Prior Publication Data

US 2021/0276695 A1     Sep. 9, 2021

(51) Int. Cl.
*B64C 13/40* (2006.01)
*B64C 9/00* (2006.01)

(52) U.S. Cl.
CPC .............. *B64C 13/40* (2013.01); *B64C 9/00* (2013.01)

(58) Field of Classification Search
CPC ... B64C 9/00; B64C 9/16–20; B64C 9/22–26; B64C 13/40
See application file for complete search history.

(56) References Cited

U.S. PATENT DOCUMENTS 3,002,500 A * 10/1961 Diesing ............... F15B 9/00
                                                418/181
3,585,902 A *  6/1971 Anderson ............ F15B 18/00
                                                91/363 A
5,074,495 A * 12/1991 Raymond ........... B64C 13/40
                                                244/78.1
5,615,593 A *  4/1997 Anderson ........... B64C 13/42
                                                91/24
7,225,905 B2   6/2007 Namuduri et al.
(Continued)

OTHER PUBLICATIONS

Cleasby, KG & Plummer, AR 2008, *A novel high efficiency electro-hydrostatic flight simulator motion system*. Fluid Power and Motion Control (FPMC 2008). Centre for PTMC, UK, pp. 437-449.

*Primary Examiner* — Christopher D Hutchens
(74) *Attorney, Agent, or Firm* — Dascenzo Gates Intellectual Property Law, P.C.

(57) ABSTRACT

Control surface actuator assemblies, aircraft hydraulic systems including the same, and associated aircraft and methods. A control surface actuator assembly includes a flight control surface operatively coupled to a support structure, a torque-generating hydraulic actuator configured to apply a torque to pivot the flight control surface, and a variable horn radius (VHR) hydraulic actuator configured to vary an actuator moment arm length for pivoting the flight control surface. In some examples, an aircraft hydraulic system includes such control surface actuator assemblies, and an aircraft includes such aircraft hydraulic systems. In some examples, a method of operating one or more flight control surfaces of an aircraft includes controlling a selected flight control surface by adjusting, with a VHR hydraulic actuator, an actuator moment arm length corresponding to the selected flight control surface and pivoting, with a torque-generating hydraulic actuator, the selected flight control surface.

20 Claims, 16 Drawing Sheets

(56) References Cited

U.S. PATENT DOCUMENTS

| | | | |
|---|---|---|---|
| 8,567,714 B2* | 10/2013 | Sheahan, Jr. | B64C 9/02 |
| | | | 244/90 R |
| 10,088,006 B2 | 10/2018 | Fox et al. | |
| 10,107,347 B2 | 10/2018 | Fox et al. | |
| 10,352,389 B2 | 7/2019 | Fox et al. | |
| 2008/0185476 A1* | 8/2008 | Suisse | F15B 18/00 |
| | | | 244/78.1 |
| 2017/0335916 A1* | 11/2017 | Fox | F15B 15/02 |
| 2018/0135717 A1 | 5/2018 | Fox et al. | |
| 2019/0048959 A1 | 2/2019 | Fox et al. | |
| 2019/0300159 A1* | 10/2019 | Kikuchi | F15D 1/12 |
| 2019/0315456 A1 | 10/2019 | Fox et al. | |
| 2019/0316606 A1 | 10/2019 | Fox et al. | |
| 2019/0316607 A1* | 10/2019 | Fox | F15B 13/044 |

* cited by examiner

CONTROL SURFACE ACTUATOR ASSEMBLIES, AIRCRAFT HYDRAULIC SYSTEMS INCLUDING THE SAME, AND ASSOCIATED AIRCRAFT AND METHODS

FIELD

The present disclosure relates to control surface actuator assemblies, aircraft hydraulic systems including the same, and associated aircraft and methods.

BACKGROUND

Aircraft include one or more movable flight control surfaces such as ailerons on the wings for roll control, elevators on the horizontal tail of the empennage for pitch control, a rudder on the vertical tail of the empennage for yaw control, a nose cone of a missile, and other movable control surfaces. Movement of a flight control surface is typically effected by one or more actuators mechanically coupled between a support member (e.g., a wing spar) and the flight control surface. In many aircraft, the actuators for flight control surfaces are linear hydraulic actuators driven by one or more hydraulic systems.

Hydraulic systems for aircraft may be designed to provide hydraulic fluid to a plurality of hydraulic actuators to move and position the flight control surfaces as necessary during the flight of the aircraft. Specifically, the hydraulic systems may include a series of supply and return lines, and one or more hydraulic actuators are positioned along the supply and return lines as well as to the flight control surfaces. A pump moves the hydraulic fluid through the supply lines and to the actuators. The hydraulic fluid is then directed into different sections of the actuator to move the actuator and thus adjust the flight control surface.

During flight, different flight control surfaces may encounter loads of varying magnitudes, requiring correspondingly varying forces produced by the hydraulic actuators to move the flight control surfaces. The force exerted by a hydraulic actuator typically depends on the pressure of the hydraulic fluid utilized by the hydraulic actuator. In some examples, the hydraulic system operates at a fixed pressure and with a variable flow rate of the hydraulic fluid. However, in such examples, significant pressure loss may occur due to the metering of the flow at the actuators. In other examples, the operating pressure of the hydraulic system is variable, but the pressure still must be configured to correspond to the largest load encountered by any of the actuators. In this manner, the peak hydraulic power that is demanded of any of the actuators presents a sizing constraint on the overall hydraulic system. Increased demands for hydraulic power may limit the effective range or performance of the aircraft, and/or may reduce the payload capacity of the aircraft. Thus, there exists a need for aircraft with hydraulic systems that can actuate flight control surfaces against large and varied loads with decreased hydraulic power demands.

SUMMARY

Control surface actuator assemblies, aircraft hydraulic systems including the same, and associated aircraft and methods are disclosed herein. A control surface actuator assembly for selectively pivoting a flight control surface relative to a support structure includes a support structure and a flight control surface operatively coupled to the support structure such that the flight control surface is configured to pivot relative to the support structure about a control surface pivot axis. The control surface actuator assembly additionally includes a torque-generating hydraulic actuator and a variable horn radius (VHR) hydraulic actuator that is pivotally coupled to the torque-generating hydraulic actuator and operatively coupled to the flight control surface. Each of the torque-generating hydraulic actuator and the VHR hydraulic actuator includes a respective hydraulic actuator housing and a respective rod that extends at least partially into the respective hydraulic actuator housing such that the respective rod is configured to translate relative to the respective hydraulic actuator housing along a respective actuator axis. Each of the torque-generating hydraulic actuator and the VHR hydraulic actuator additionally includes a respective hydraulic valve that regulates a flow of hydraulic fluid relative to the respective hydraulic actuator housing to control a position of the respective rod relative to the respective hydraulic actuator housing. The torque-generating hydraulic actuator and the VHR hydraulic actuator are configured to pivot relative to one another about an actuator coupling axis. The torque-generating hydraulic actuator is configured to apply a torque to the flight control surface to pivot the flight control surface relative to the support structure. The VHR hydraulic actuator is configured to selectively vary an actuator moment arm length, as measured between the control surface pivot axis and the actuator coupling axis, to at least partially regulate the torque applied to the flight control surface by the torque-generating hydraulic actuator.

In some examples, an aircraft hydraulic system for operating one or more flight control surfaces of an aircraft includes a fluid reservoir containing a volume of hydraulic fluid, one or more hydraulic pumps configured to pressurize the hydraulic fluid, and a plurality of hydraulic actuators, one or more of which are configured to selectively pivot a respective flight control surface of the one or more flight control surfaces. Examples of aircraft hydraulic systems further include a plurality of hydraulic conduits configured to convey the hydraulic fluid among components of the aircraft hydraulic system. In some such examples, at least one hydraulic actuator of the plurality of hydraulic actuators is a torque-generating hydraulic actuator of a control surface actuator assembly, and at least one other hydraulic actuator of the plurality of hydraulic actuators is a VHR hydraulic actuator of the control surface actuator assembly.

In some examples, an aircraft includes one or more flight control surfaces, a control surface actuator assembly that includes a VHR hydraulic actuator and a torque-generating hydraulic actuator, and an aircraft hydraulic system.

In some examples, a method of operating one or more flight control surfaces of an aircraft includes controlling, with a control surface actuator assembly and with an aircraft hydraulic system, a selected flight control surface. In such examples, the controlling the selected flight control surface includes adjusting, with a VHR hydraulic actuator, the actuator moment arm length corresponding to the selected flight control surface and pivoting, with a torque-generating hydraulic actuator, the selected flight control surface relative to the support structure.

DESCRIPTION

Figure 1:
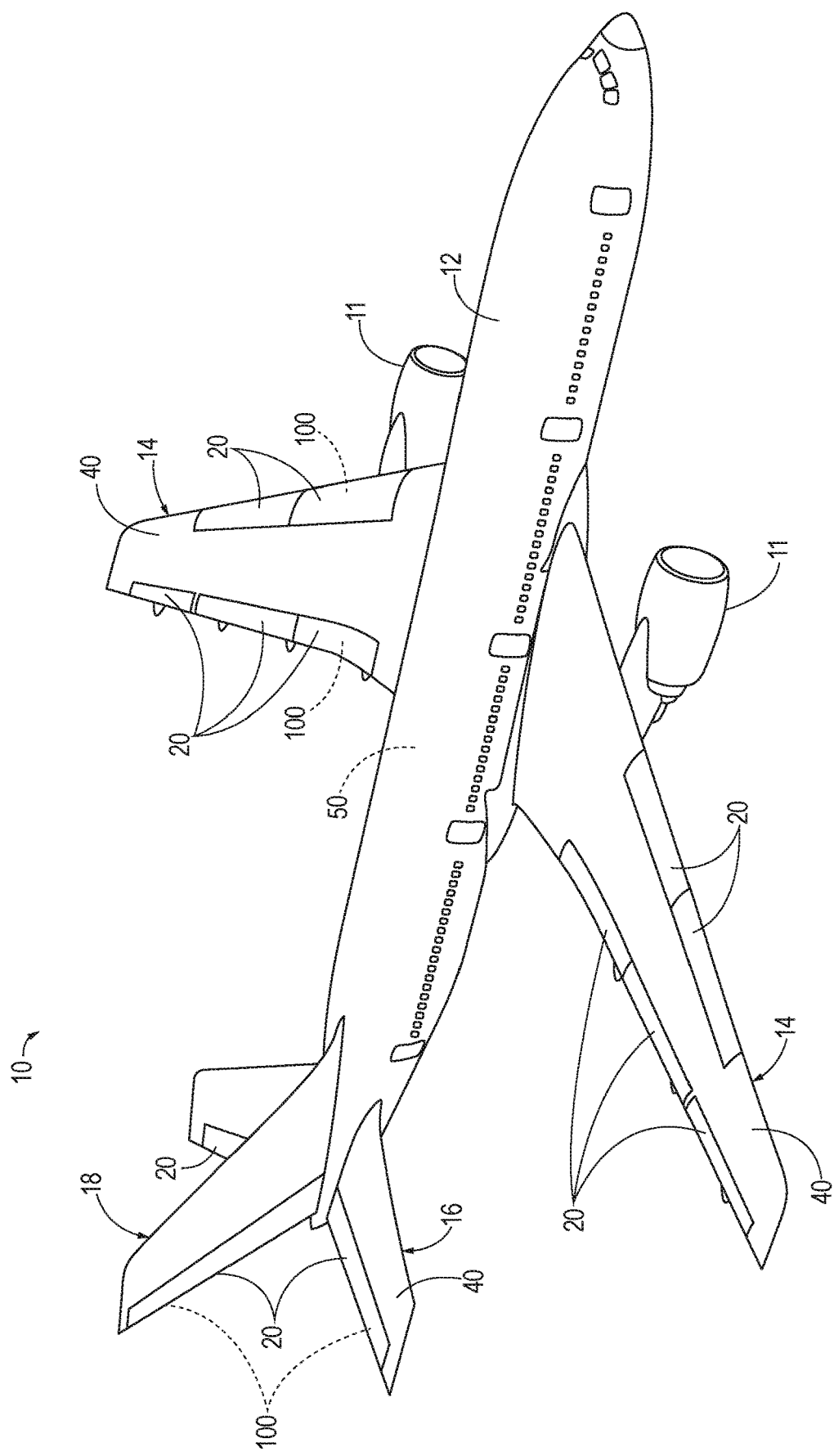
FIG. 1 is a schematic representation of an example of an aircraft that includes aircraft hydraulic systems and/or control surface actuator assemblies according to the present disclosure.

FIGS. 1-16 provide illustrative, non-exclusive examples of control surface actuator assemblies 100, of aircraft hydraulic systems 50 including control surface actuator assemblies 100, of aircraft 10 including aircraft hydraulic systems 50, and/or of methods 400 of operating one or more flight control surfaces 20 of aircraft 10, according to the present disclosure. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency. Elements, components, and/or features that are discussed herein with reference to one or more of FIGS. 1-16 may be included in and/or utilized with any of FIGS. 1-16 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 illustrates an example of an aircraft 10 that may include aircraft hydraulic systems 50 and/or control surface actuator assemblies 100 according to the present disclosure. As shown in FIG. 1, aircraft 10 may include one or more engines 11, a fuselage 12, one or more wings 14, a horizontal stabilizer 16, and/or a vertical stabilizer 18. Aircraft 10 generally includes one or more flight control surfaces 20 movably attached to various portions of aircraft 10, such as to wing 14, horizontal stabilizer 16, and/or vertical stabilizer 18. More specifically, each flight control surface 20 may be pivotally coupled to a respective support structure 40, such as may be a component of wing 14, of horizontal stabilizer 16, and/or of vertical stabilizer 18. Examples of flight control surfaces 20 include an aileron, a rudder, an elevator, a flap, a spoiler, and an air brake. As further shown in FIG. 1, and as described in more detail herein, aircraft 10 further includes at least one control surface actuator assembly 100 for selectively pivoting a respective flight control surface 20 relative to a respective support structure 40. In some examples, and as described in more detail herein, aircraft 10 further includes an aircraft hydraulic system 50 for operating control surface actuator assembly 100.

While the present disclosure generally describes control surface actuator assemblies 100 in the context of aircraft hydraulic systems 50 that include the control surface actuator assemblies 100, this is not required, and it is additionally within the scope of the present disclosure that control surface actuator assemblies 100 and/or any component thereof may be utilized in any appropriate context. As examples, control surface actuator assemblies 100 and/or components thereof may be implemented in any type of open-loop or closed-loop control system for use in any one of a variety of different applications in any industry, without limitation. In this regard, control surface actuator assemblies 100 according to the present disclosure and/or components thereof may be implemented in any vehicular application or non-vehicular application. As examples, control surface actuator assemblies 100 and/or components thereof may be implemented in any marine, ground, air, and/or space application, and in any vehicular or non-vehicular system, subsystem, assembly, subassembly, structure, building, machine, or application that utilizes an actuator to actuate a movable device.

Figure 2:
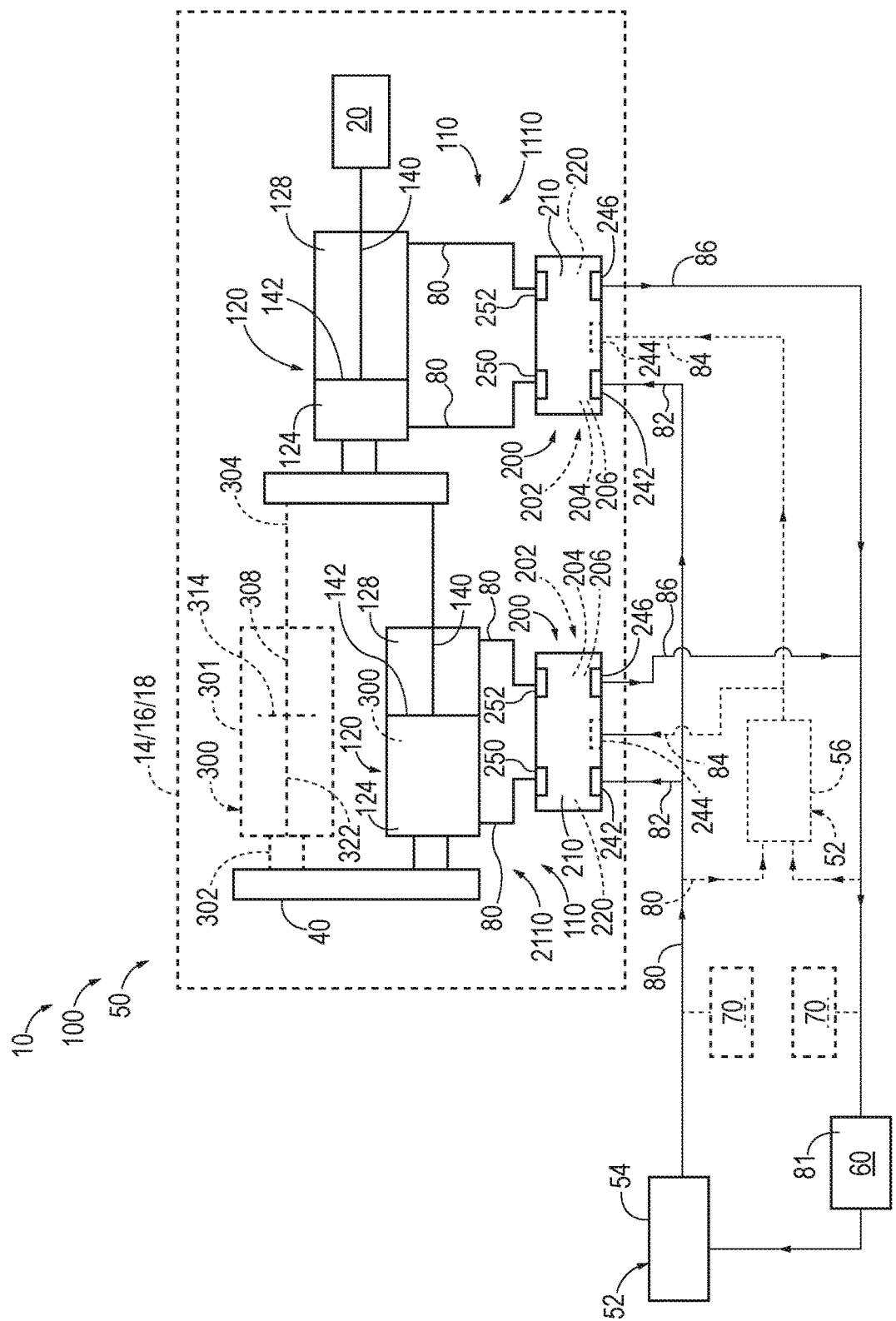
FIG. 2 is a schematic representation of examples of aircraft hydraulic systems and of control surface actuator assemblies according to the present disclosure.
Figure 3:
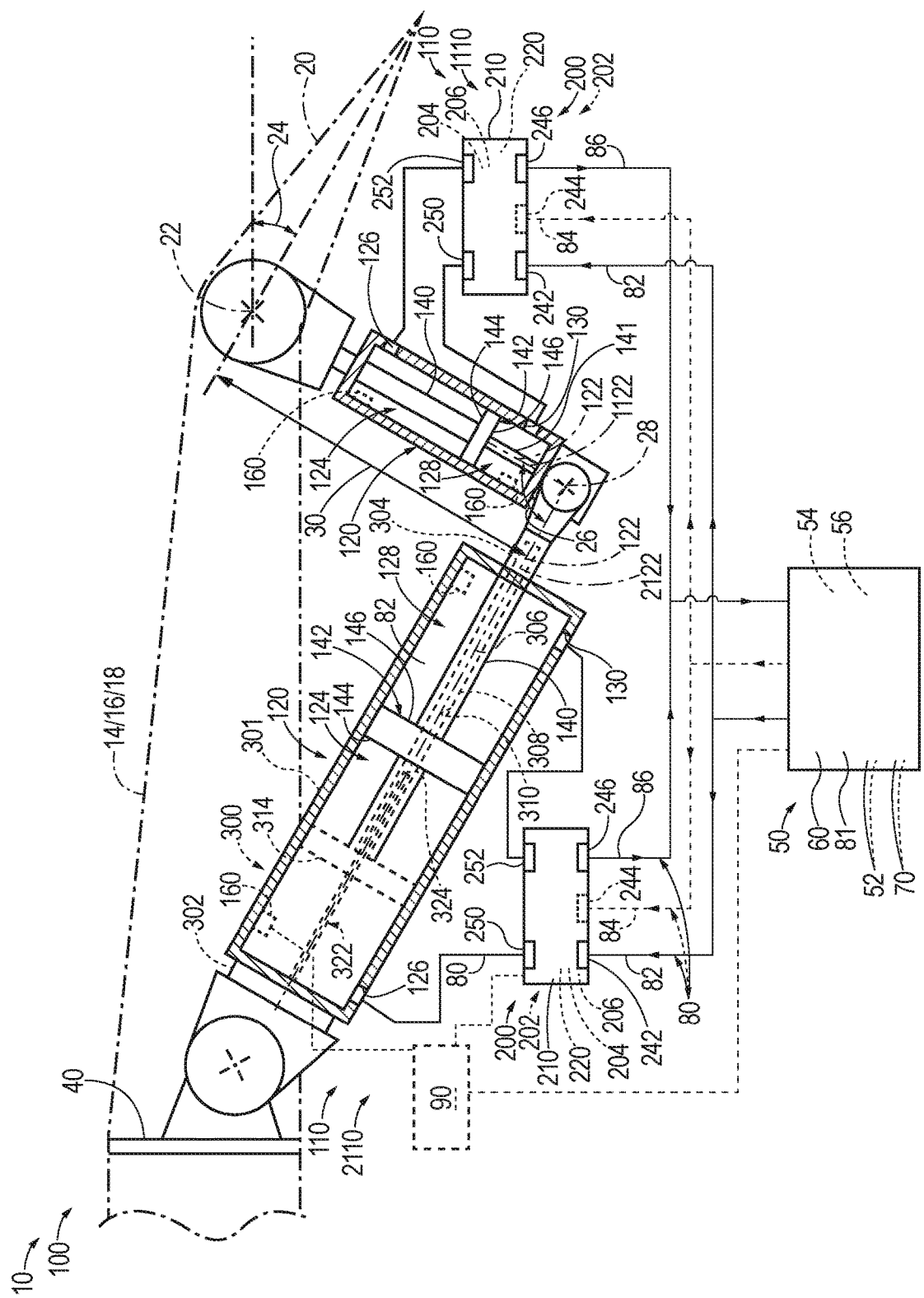
FIG. 3 is a schematic representation of examples of aircraft hydraulic systems and of control surface actuator assemblies according to the present disclosure.

FIGS. 2-3 schematically illustrate examples of control surface actuator assemblies 100 according to the present disclosure. As schematically illustrated in FIGS. 2-3, control surface actuator assembly 100 includes support structure 40 and flight control surface 20 operatively coupled to support structure 40 such that flight control surface 20 is configured to pivot relative to support structure 40 about a control surface pivot axis 22 (shown in FIG. 3). As further schematically illustrated in FIGS. 2-3, control surface actuator assembly 100 additionally includes a torque-generating hydraulic actuator 2110 and a variable horn radius (VHR) hydraulic actuator 1110 that is pivotally coupled to torque-generating hydraulic actuator 2110. Specifically, and as schematically illustrated in FIG. 3, VHR hydraulic actuator 1110 and torque-generating hydraulic actuator 2110 are configured to pivot relative to one another about an actuator coupling axis 28.

Torque-generating hydraulic actuator 2110 and VHR hydraulic actuator 1110 collectively operate to pivot flight control surface 20 relative to support structure 40. More specifically, and as described in more detail herein, torque-generating hydraulic actuator 2110 is configured to apply a torque to flight control surface 20 via VHR hydraulic actuator 1110 to pivot flight control surface 20 relative to support structure 40. Stated differently, VHR hydraulic actuator 1110 is coupled to flight control surface 20 such that flight control surface 20 and at least a portion of VHR hydraulic actuator 1110 pivot about control surface pivot axis 22 at least substantially in unison, and such that applying a torque to VHR hydraulic actuator 1110 with torque-generating hydraulic actuator 2110 operates to pivot flight control surface 20 about control surface pivot axis 22.

In this manner, VHR hydraulic actuator 1110 may be described as representing and/or operating as a bellcrank and/or as a control horn for pivoting flight control surface 20. However, in contrast to traditional control horn structures, and as described in more detail herein, VHR hydraulic actuator 1110 is configured to be selectively transitioned among a plurality of configurations to selectively vary a lever arm with which flight control surface 20 is pivoted. More specifically, and with reference to FIG. 3, VHR hydraulic actuator 1110 is configured to selectively vary an actuator moment arm length 30, as measured between control surface pivot axis 22 and actuator coupling axis 28, to at least partially regulate the torque applied to flight control surface 20 by torque-generating hydraulic actuator 2110. In particular, for a given force exerted upon VHR hydraulic actuator 1110 by torque-generating hydraulic actuator 2110, actuating VHR hydraulic actuator 1110 to shorten actuator moment arm length 30 operates to decrease the torque applied to flight control surface 20, while actuating VHR hydraulic actuator 1110 to lengthen actuator moment arm length 30 operates to increase the torque applied to flight control surface 20. In this manner, and as described herein, the torque applied to flight control surface 20 by torque-generating hydraulic actuator 2110 may be selectively and dynamically varied to accommodate varying load demands produced by flight control surface 20 without necessitating substantial reconfiguration of torque-generating hydraulic actuator 2110 and/or aspects of the corresponding hydraulic system such as hydraulic system pressure.

With continued reference to FIGS. 2-3, control surface actuator assembly 100 may be described in the context of, and/or as being a component of, aircraft hydraulic system 50. For example, and as schematically illustrated in FIG. 1, aircraft hydraulic system 50 according to the present disclosure for operating one or more flight control surfaces 20 includes a fluid reservoir 60 containing a volume of hydraulic fluid 81, one or more hydraulic pumps 52, a plurality of hydraulic actuators 110, and a plurality of hydraulic conduits 80. As further schematically illustrated in FIG. 3, aircraft hydraulic system 50 and/or control surface actuator assembly 100 further may include a controller 90 for controlling movement and pressure of hydraulic fluid 81 through aircraft hydraulic system 50.

As described in more detail herein, each hydraulic pump 52 is configured to pressurize hydraulic fluid 81 for operative utilization by the plurality of hydraulic actuators 110, and each hydraulic conduit 80 is configured to convey hydraulic fluid 81 among the components of aircraft hydraulic system 50. Each hydraulic pump 52 may be configured to pressurize hydraulic fluid 81 to any appropriate pressure. In some examples, and as schematically illustrated in FIG. 2 and as described in more detail herein, at least one hydraulic pump 52 is a central pump 54 that is configured to pressurize hydraulic fluid 81 to a base pressure, and at least one other hydraulic pump 52 is a boost pump 56 that is configured to pressurize hydraulic fluid 81 to a boost pressure that is greater than the base pressure. In some examples, the base pressure additionally or alternatively may be referred to as a quiescent pressure, while the boost pressure may be referred to as a variable pressure. As used herein, a pressure of hydraulic fluid 81 produced by central pump 54 and/or by boost pump 56 may be described as an operating pressure of aircraft hydraulic system 50 and/or of a component thereof, such as hydraulic actuator 110. The base pressure and the boost pressure may have any appropriate respective values. As examples, the base pressure and/or the boost pressure each may be at least 800 pounds per square inch (psi), at least 1000 psi, at least 1300 psi, at least 1500 psi, at least 2000 psi, at least 2500 psi, at least 3000 psi, at least 5000 psi, at least 10000 psi, at most 12000 psi, at most 7000 psi, at most 2700 psi, at most 2200 psi, at most 1700 psi, at most 1200 psi, and/or at most 900 psi. As a more specific example, the base pressure produced by central pump 54 may be about 1200 psi and, the boost pressure produced by boost pump 56 may be about 3000 psi. Central pump 54 and/or boost pump 56 may include and/or be any appropriate hydraulic pump, such as an engine-driven hydraulic pump and/or an electric-motor-driven hydraulic pump.

While FIG. 2 schematically illustrates aircraft hydraulic system 50 as including a single central pump 54 and a single boost pump 56, it is additionally within the scope of the present disclosure that aircraft hydraulic system 50 includes more than one central pump 54 and/or more than one boost pump 56. In some examples, aircraft 10 and/or aircraft hydraulic system 50 includes a number of boost pumps 56 that is equal to the number of hydraulic actuators 110 that serve a common load and/or the number of hydraulic actuators 110 that are served by aircraft hydraulic system 50.

As further schematically illustrated in FIG. 2, the plurality of hydraulic conduits 80 may include one or more supply lines 82 configured to convey hydraulic fluid 81 at the base pressure, one or more boost lines 84 configured to convey hydraulic fluid 81 at the boost pressure, and/or one or more return lines 86 configured to convey hydraulic fluid 81 at a pressure that is less than the base pressure. Return lines 86 may carry hydraulic fluid 81 to fluid reservoir 60, where hydraulic fluid 81 may be stored and cooled before being re-supplied to hydraulic pump 52. In the event that an inadequate amount of hydraulic fluid 81 is available at boost pump 56, returning hydraulic fluid 81 may be supplied to boost pump 56 before it is moved along return line 86 to fluid reservoir 60. In some examples, and as further schematically illustrated in FIG. 2, aircraft hydraulic system 50 additionally includes one or more accumulators 70 for maintaining a pressure of hydraulic fluid 81 within hydraulic conduits 80. As schematically illustrated in FIG. 2, accumulator 70 may be connected to supply line 82 downstream from central pump 54, and/or may be connected to return line 86 upstream of fluid reservoir 60, to supply additional hydraulic fluid 81 for use in aircraft hydraulic system 50. Accumulator 70 may supply hydraulic fluid 81 in certain circumstances, such as but not limited to when a volume of hydraulic fluid 81 moving along supply line 82 drops below a predetermined level or when a pressure of hydraulic fluid 81 in supply line 82 is below a predetermined level.

When present, boost pump 56 is positioned along aircraft hydraulic system 50 away from central pump 54. This distributed architecture may provide for more responsiveness as hydraulic fluid 81 at the boost pressure can be supplied to hydraulic actuators 110 in less time. The distributed architecture also allows for hydraulic fluid 81 from hydraulic actuators 110 to bypass a portion of return line 86 and be directed to boost pump 56. This feature saves energy loss due to a pressure drop in return line 86 that routes hydraulic fluid 81 back to the central pump 54, and thereby reduced peak power demand.

In general, each hydraulic pump 52 (such as central pump 54 and/or boost pump 56) may be configured to pressurize hydraulic fluid 81 to a variable pressure. In this manner, an example of aircraft hydraulic system 50 that includes central pump 54 but not boost pump 56 may be capable of meeting the varying operational demands of each hydraulic actuator 110 through variation of the operating pressure. For example, such an aircraft hydraulic system 50 may produce a varying pressure of hydraulic fluid 81 that depends upon the phase of flight in which aircraft 10 operates (e.g., a take-off phase, a cruising phase, or a landing phase). However, in an example in which aircraft hydraulic system 50 lacks boost pump 56, central pump 54 generally must operate at a sufficiently high pressure to serve the pressure requirements of the single hydraulic actuator 110 of the plurality of hydraulic actuators 110 that encounters the highest aerodynamic load at a given instant. By contrast, and as described herein, utilizing central pump 54 in combination with one or more boost pumps 56 (e.g., up to and including a number of boost pumps 56 equal to the number of sets of hydraulic actuators 110 serving a common load and/or the number of hydraulic actuators 110 served by the hydraulic system) may enable selective variation of the respective operating pressures of a plurality of hydraulic actuators 110 at a given instant. Utilizing such technologies (e.g., variable pressure and/or distributed architectures utilizing boost pump 56) in combination with VHR hydraulic actuator 1110 further may limit a peak power demand of aircraft hydraulic system 50. More specifically, in such examples, each VHR hydraulic actuator 1110 may be utilized to bring the respective actuator moment arm length 30 to a value that enables the corresponding torque-generating hydraulic actuator 2110 to operate at a pressure of hydraulic fluid 81 that is at least substantially equal to a pressure of hydraulic fluid 81 being served to one or more other hydraulic actuators 110 by a given boost pump 56. In this manner, such a configuration may facilitate reducing pressure loss due to metering of the flow at one or more hydraulic actuators 110, thereby minimizing the number of boost pumps 56 in aircraft hydraulic system 50 as well as minimizing peak power demands, while also satisfying the dynamic (and dynamically varying) requirements of the corresponding flight control surface 20. Additionally, and as discussed herein, utilizing VHR hydraulic actuator 1110, such as in combination with technologies such as variable pressure and/or distributed hydraulic architectures, may facilitate and/or result in a reduction of peak power demands of one or more hydraulic actuators 110 (such as torque-generating hydraulic actuator 2110), thereby relaxing an overall sizing constraint on aircraft hydraulic system 50.

Aircraft 10 may include multiple aircraft hydraulic systems 50 to control the movement of the flight control surfaces 20. For example, aircraft 10 may include a first aircraft hydraulic system 50 that extends along a first portion of the aircraft (e.g., a starboard side). The first aircraft hydraulic system 50 includes central pump 54 that is driven by a first engine 11 (e.g., a starboard engine 11). A second aircraft hydraulic system 50 may be positioned on a second portion of the aircraft (e.g., a port side) and include a separate central pump 54 that is driven by a different engine 11 (e.g., a port engine 11). The number of engines 11 and/or the number of aircraft hydraulic systems 50 in aircraft 10 may vary. As examples, aircraft 10 may include one engine 11, two engines 11, three engines 11, four engines 11, or more than four engines 11. Further, each engine 11 may drive any appropriate number of central pumps 54. For example, aircraft 10 may include four main engines 11, namely two left main engines 11 and two right main engines 11. In some examples, each main engine 11 drives two respective central pumps 54. In some such examples, aircraft 10 includes two aircraft hydraulic systems 50, such that the four central pumps 54 associated with the left main engines 11 produce hydraulic power to a left aircraft hydraulic system 50 and such that the four central pumps 54 associated with the right main engines 11 produce hydraulic power to a right aircraft hydraulic system 50.

As schematically illustrated in FIGS. 2-3, in an example in which aircraft hydraulic system 50 includes control surface actuator assembly 100, at least one of the plurality of hydraulic actuators 110 is torque-generating hydraulic actuator 2110, and at least one other of the plurality of hydraulic actuators 110 is VHR hydraulic actuator 1110. Each of VHR hydraulic actuator 1110 and torque-generating hydraulic actuator 2110 may have any appropriate configuration, such as may be known in the art of hydraulic actuators. For example, and as schematically illustrated in FIGS. 2-3, each of VHR hydraulic actuator 1110 and torque-generating hydraulic actuator 2110 includes a respective hydraulic actuator housing 120 (e.g., a hydraulic cylinder) and a respective rod 140 that extends at least partially into the respective hydraulic actuator housing 120. The respective rod 140 is configured to translate axially relative to the respective hydraulic actuator housing 120 along a respective actuator axis 122 (shown in FIG. 3). In this manner, each of VHR hydraulic actuator 1110 and torque-generating hydraulic actuator 2110 may be described as including a linear hydraulic actuator that utilizes a hydraulic cylinder.

Each of VHR hydraulic actuator 1110 and torque-generating hydraulic actuator 2110 further includes a respective hydraulic valve 200 that regulates a flow of hydraulic fluid 81 relative to the respective hydraulic actuator housing 120 to control a position of the respective rod 140 relative to the respective hydraulic actuator housing 120. With reference to FIG. 3, actuator axis 122 corresponding to VHR hydraulic actuator 1110 may be described as a VHR actuator axis 1122, and actuator axis 122 corresponding to torque-generating hydraulic actuator 2110 may be described as a torque-generating actuator axis 2122. In this manner, VHR hydraulic actuator 1110 may be described as being configured to selectively translate the respective rod 140 of VHR hydraulic actuator 1110 along VHR actuator axis 1122 to vary actuator moment arm length 30.

VHR hydraulic actuator 1110 and torque-generating hydraulic actuator 2110 may have any appropriate relative orientation and/or range of motion during operative use of control surface actuator assembly 100. For example, and as shown in FIG. 3, a configuration of control surface actuator assembly 100 may be characterized by a control surface torque angle 26, as measured between torque-generating actuator axis 2122 and VHR actuator axis 1122. Control surface torque angle 26 generally assumes a value that is greater than 0 degrees and less than 180 degrees, and may assume any appropriate value during operative use of control surface actuator assembly 100. As more specific examples, during operative use of control surface actuator assembly 100, control surface torque angle 26 may be at least 30 degrees, at least 50 degrees, at least 70 degrees, at least 90 degrees, at least 110 degrees, at least 130 degrees, at least 150 degrees, at most 160 degrees, at most 140 degrees, at most 120 degrees, at most 100 degrees, at most 80 degrees, at most 60 degrees, and/or at most 40 degrees.

As another example, and as further schematically illustrated in FIG. 3, a configuration of control surface actuator assembly 100 may be characterized by a control surface deflection angle 24 of flight control surface 20 relative to support structure 40, as measured in a plane perpendicular to control surface pivot axis 22. As more specific examples, control surface actuator assembly 100 may be configured to selectively vary control surface deflection angle 24 through an angular range of motion that is at least 5 degrees, at least 10 degrees, at least 20 degrees, at least 40 degrees, at least 60 degrees, at least 80 degrees, at most 90 degrees, at most 70 degrees, at most 50 degrees, at most 30 degrees, at most 15 degrees, and/or at most 7 degrees.

As yet another example, control surface actuator assembly 100 may be characterized in terms of an axial range of motion of VHR hydraulic actuator 1110. In particular, VHR hydraulic actuator 1110 may be described as varying actuator moment arm length 30 among a range of values defined between and including a minimum actuator moment arm length 30 and a maximum actuator moment arm length 30. As more specific examples, VHR hydraulic actuator 1110 may be configured such that the maximum actuator moment arm length 30 is at least 1.1 times the minimum actuator moment arm length 30, at least 1.3 times the minimum actuator moment arm length 30, at least 1.5 times the minimum actuator moment arm length 30, at least 2 times the minimum actuator moment arm length 30, at least 2.5 times the minimum actuator moment arm length 30, at most 3 times the minimum actuator moment arm length 30, at most 2.2 times the minimum actuator moment arm length 30, at most 1.7 times the minimum actuator moment arm length 30, and/or at most 1.2 times the minimum actuator moment arm length 30.

In some examples, and as shown in FIG. 3, hydraulic actuator housing 120 of torque-generating hydraulic actuator 2110 is pivotally coupled to support structure 40, and rod 140 of torque-generating hydraulic actuator 2110 is pivotally coupled to VHR hydraulic actuator 1110. However, this is not required of all examples of control surface actuator assembly 100, and it is additionally within the scope of the present disclosure that torque-generating hydraulic actuator 2110 is configured such that the respective hydraulic actuator housing 120 is pivotally coupled to VHR hydraulic actuator 1110 and such that the respective rod 140 is pivotally coupled to support structure 40.

In some examples, and as shown in FIG. 3, hydraulic actuator housing 120 of VHR hydraulic actuator 1110 is pivotally coupled to torque-generating hydraulic actuator 2110, and rod 140 of VHR hydraulic actuator 1110 is operatively coupled to flight control surface 20. However, this is not required of all examples of control surface actuator assembly 100, and it is additionally within the scope of the present disclosure that VHR hydraulic actuator 1110 is configured such that the respective hydraulic actuator housing 120 is operatively coupled to flight control surface 20 and such that the respective rod 140 is pivotally coupled to torque-generating hydraulic actuator 2110.

As discussed, each hydraulic actuator 110 (such as VHR hydraulic actuator 1110 and/or torque-generating hydraulic actuator 2110) may include any appropriate structure, such as that of a conventional hydraulic cylinder. In some examples, and as schematically illustrated in FIGS. 2-3, each of VHR hydraulic actuator 1110 and torque-generating hydraulic actuator 2110 includes a respective piston 142 that extends within the respective hydraulic actuator housing 120 to define a respective first chamber 124 and a respective second chamber 128 on opposite sides of piston 142 within hydraulic actuator housing 120. In such examples, each rod 140 extends from the respective piston 142 and out of the respective hydraulic actuator housing 120. Thus, in such examples, a difference in the hydraulic pressure of hydraulic fluid 81 in each of the respective first chamber 124 and the respective second chamber 128 operates to move the respective piston 142 within the respective hydraulic actuator housing 120 to translate the respective rod 140 along the respective actuator axis 122. In such examples, and as further schematically illustrated in FIG. 3, each hydraulic actuator housing 120 includes a respective first chamber port 126 for flowing hydraulic fluid 81 into and out of the respective first chamber 124 and a respective second chamber port 130 for flowing hydraulic fluid 81 into and out of the respective second chamber 128. In some examples, and as shown in FIG. 3, torque-generating hydraulic actuator 2110 and/or VHR hydraulic actuator 1110 additionally includes a support rod 141 (shown in FIG. 3 as a component of VHR hydraulic actuator 1110) that extends from the respective piston 142 opposite the respective rod 140 and that is operatively coupled to the respective hydraulic actuator housing 120. In such examples, support rod 141 may operate to enhance a rigidity of the corresponding hydraulic actuator 110.

In some examples, the respective piston 142 of each of torque-generating hydraulic actuator 2110 and VHR hydraulic actuator 1110 may be characterized by a surface area thereof that faces each of the respective first chamber 124 and the respective second chamber 128. As an example, and as shown in FIG. 3, the respective piston 142 of each of torque-generating hydraulic actuator 2110 and VHR hydraulic actuator 1110 may be described as including a respective first piston surface 144 with a respective first piston surface area that partially defines the respective first chamber 124 and a respective second piston surface 146 with a respective second piston surface area that partially defines the respective second chamber 128. In such examples, the respective first piston surface area and the respective second piston surface area of one or both of VHR hydraulic actuator 1110 and torque-generating hydraulic actuator 2110 may be at least substantially equal, or may be unequal. In some examples, the first piston surface area and/or the second piston surface area is at least partially defined by the respective dimensions of the respective rod 140 and/or (when present) the respective support rod 141. As an example, FIG. 3 illustrates a configuration in which VHR hydraulic actuator 1110 includes rod 140 extending from first piston surface 144 within first chamber 124 and support rod 141 extending from second piston surface 146 within second chamber 128. In the example of FIG. 3, rod 140 has a greater diameter than that of support rod 141, such that the second piston surface area is greater than the first piston surface area. Accordingly, in such an example, hydraulic fluid 81 at a given pressure within first chamber 124 will exert a smaller total force on piston 142 relative to hydraulic fluid 81 at the same given pressure within second chamber 128.

In some examples, operative use of control surface actuator assembly 100 includes utilizing VHR hydraulic actuator 1110 to reduce actuator moment arm length 30, such as to reduce the torque applied to flight control surface 20 at a given operating pressure of torque-generating hydraulic actuator 2110 (and hence a given force exerted by rod 140 of torque-generating hydraulic actuator 2110 upon VHR hydraulic actuator 1110). However, in some cases, reducing actuator moment arm length 30 may introduce an undesirable degree of flutter susceptibility or response in flight control surface 20 during flight. Stated differently, flight control surface 20 may be characterized by a resonance condition in which flutter may occur, and reducing actuator moment arm length 30 may cause the operational bandwidth of control surface actuator assembly 100 to overlap with such a resonance condition. In such examples, the flutter of flight control surface 20 may be mitigated and/or minimized by utilizing a mechanism for damping an oscillation of flight control surface 20. Accordingly, in some examples, and as further schematically illustrated in FIGS. 2-3, control surface actuator assembly 100 additionally includes one or more inerters 300 for damping a motion of one or more components of control surface actuator assembly 100. More specifically, and as schematically illustrated in FIGS. 2-3, each inerter 300 includes a respective first terminal 302 and a respective second terminal 304 that are configured to translate with respect to one another along a respective inerter axis 306 (shown in FIG. 3), and each inerter 300 is configured to resist an acceleration of the respective first terminal 302 relative to the respective second terminal 304. Accordingly, in such examples, inerter 300 may operate to provide critical damping of an oscillation of flight control surface 20, thus expanding the practical operational bandwidth of control surface actuator assembly 100 to include smaller values of actuator moment arm length 30, and to lower a peak power demand of the aircraft hydraulic system 50.

Figure 4:
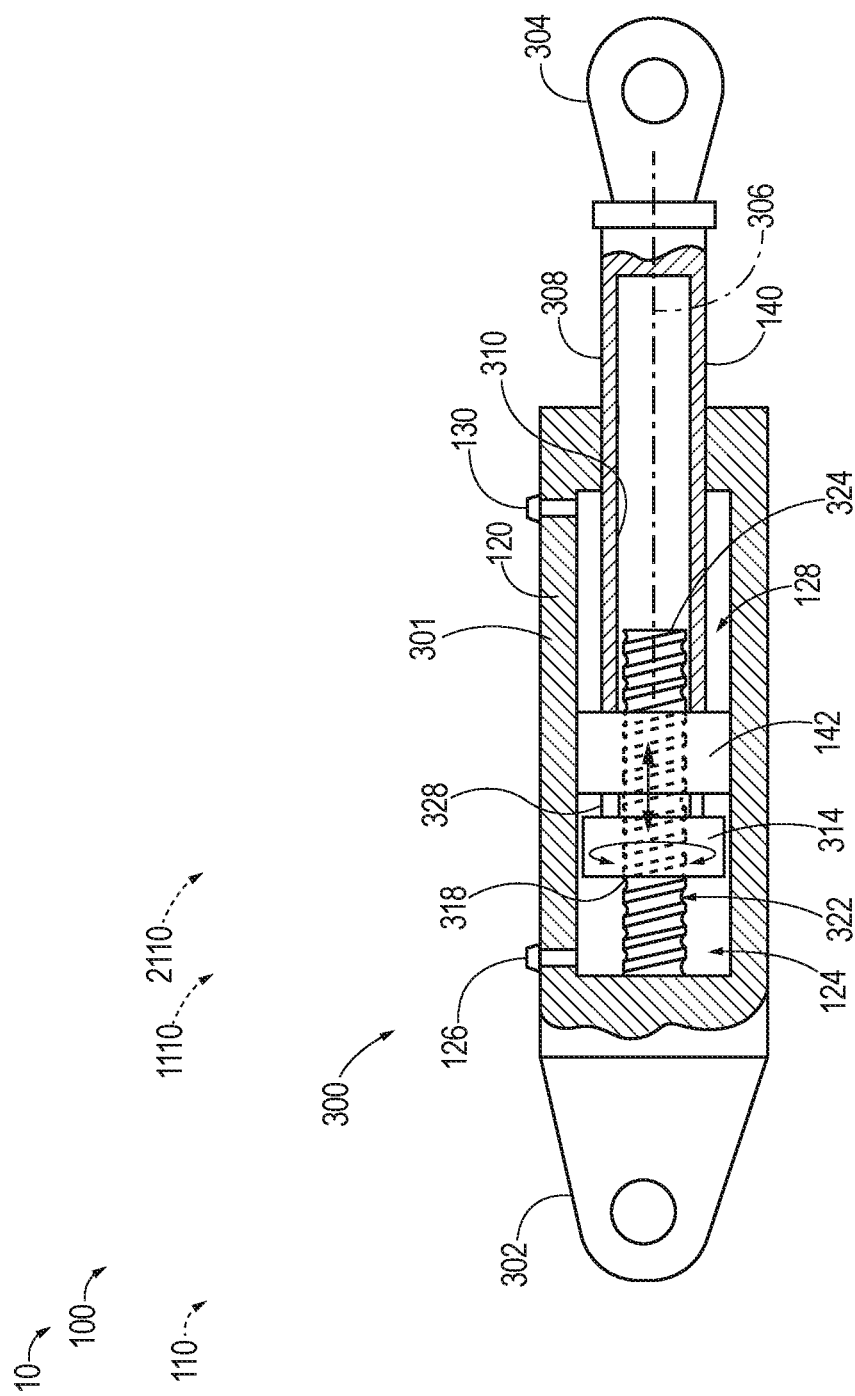
FIG. 4 is a cross-sectional side elevation view illustrating an example of a hydraulic actuator that includes an inerter according to the present disclosure.
Figure 5:
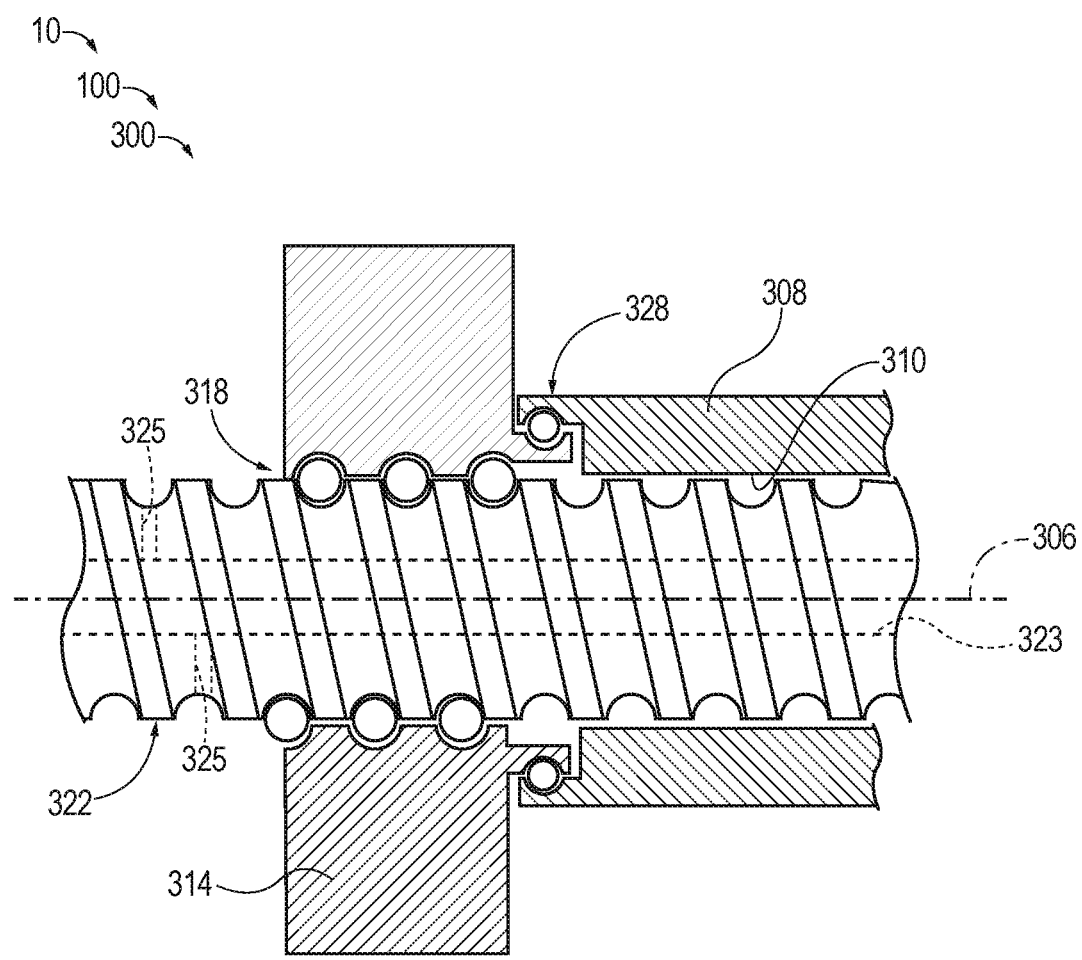
FIG. 5 is a fragmentary cross-sectional side elevation view illustrating a portion of an example of an inerter according to the present disclosure.

As schematically illustrated in FIG. 2, inerter 300 may be a component of and/or incorporated into hydraulic actuator 110 (e.g., into the respective hydraulic actuator housing 120 of torque-generating hydraulic actuator 2110 and/or of VHR hydraulic actuator 1110), and/or may be a separate unit. Specifically, FIG. 2 schematically illustrates in dashed lines an example in which inerter 300 is positioned in parallel with hydraulic actuator housing 120 of torque-generating hydraulic actuator 2110, as well as an example in which torque-generating hydraulic actuator 2110 includes inerter 300. FIG. 3 less schematically illustrates an example in which torque-generating hydraulic actuator 2110 includes inerter 300. FIG. 4 is a less schematic illustration of an example of inerter 300 that is incorporated into hydraulic actuator housing 120 of an instance of hydraulic actuator 110, while FIG. 5 is a less schematic illustration of a portion of another example of inerter 300. As schematically illustrated in FIGS. 2-3 and less schematically illustrated in FIGS. 4-5, each inerter 300 may include a respective inerter housing 301 (shown in FIGS. 2-4), a respective threaded shaft 322 that is coupled to the respective first terminal 302 and that terminates in a respective shaft free end 324 (labeled in FIGS. 3-4), and a respective inerter rod 308 that is coupled to the respective second terminal 304. In this manner, inerter rod 308 and second terminal 304 are configured to translate relative to first terminal 302 along the respective inerter axis 306 in unison. Each of inerter rod 308 and threaded shaft 322 extends at least partially within the respective inerter housing 301.

Inerter rod 308 and threaded shaft 322 may have any appropriate respective and/or relative configurations. In some examples, and as shown in FIGS. 3-4, inerter rod 308 and/or threaded shaft 322 extends at least substantially parallel to inerter axis 306. In some examples, and as shown in FIGS. 3-5, inerter rod 308 is hollow and defines an inerter rod bore 310. In some such examples, and as further shown in FIGS. 3-5, shaft free end 324 of threaded shaft 322 (labeled in FIGS. 3-4) is received within inerter rod bore 310. Additionally or alternatively, and as shown in FIG. 5, threaded shaft 322 may be hollow and define a respective shaft bore 323 that is open on shaft free end 324 (not visible in FIG. 5). In some such examples, and as illustrated in FIG. 5, threaded shaft 322 defines one or more radial passages 325 extending radially from shaft bore 323 to an exterior side of threaded shaft 322 to allow fluid (e.g., hydraulic fluid 81) to flow between shaft bore 323 and the exterior side of threaded shaft 322. Such a configuration may be beneficial in an example in which inerter 300 is incorporated into hydraulic actuator 110.

Each inerter 300 may be configured to resist a relative acceleration between the respective first terminal 302 and the respective second terminal 304 in any appropriate manner. In some examples, and as shown in FIGS. 2-5, each inerter 300 includes a respective flywheel 314 with a respective flywheel annulus 318 (shown in FIGS. 4-5) that is coupled to one or both of the respective inerter rod 308 and the respective threaded shaft 322. In such examples, flywheel 314 is configured to rotate relative to threaded shaft 322 with a rotational velocity that is proportional to a linear velocity at which the respective inerter rod 308 translates with respect to the respective threaded shaft 322. More specifically, and as best shown in FIG. 5, flywheel 314 may be threadingly coupled to threaded shaft 322 such that translating flywheel 314 relative to threaded shaft 322 (and/or vice-versa) along inerter axis 306 forces flywheel 314 to rotate relative to threaded shaft 322. In this manner, in such examples, a rotational inertia of flywheel 314 operates to resist an angular acceleration of flywheel 314, thus resisting a linear acceleration of threaded shaft 322 (and first terminal 302) with respect to inerter rod 308 (and second terminal 304).

Flywheel 314 may be operatively coupled to one or more other components of inerter 300 in any appropriate manner. As examples, flywheel annulus 318 may be operatively coupled to inerter rod 308, to threaded shaft 322, and/or to inerter housing 301. Additionally or alternatively, and as shown in FIGS. 4-5, flywheel 314 may include a flywheel bearing 328 at flywheel annulus 318 to rotatably couple flywheel 314 to at least one other component of inerter 300. In some such examples, flywheel bearing 328 is configured to permit flywheel 314 to axially translate with inerter rod 308 as flywheel 314 rotates relative to threaded shaft 322.

As discussed, one or both of torque-generating hydraulic actuator 2110 and VHR hydraulic actuator 1110 may include a respective inerter 300. In such examples, and as shown in FIGS. 3-4, the respective hydraulic actuator housing 120 of torque-generating hydraulic actuator 2110 and/or of VHR hydraulic actuator 1110 may include and/or be inerter housing 301 of the respective inerter 300. Similarly, in such examples, and as shown in FIGS. 3-4, the respective rod 140 of torque-generating hydraulic actuator 2110 and/or of VHR hydraulic actuator 1110 may include and/or be inerter rod 308 of the respective inerter 300. In some such examples, and as shown in FIG. 4, flywheel 314 of the respective inerter 300 is rotatably coupled to the respective piston 142 of torque-generating hydraulic actuator 2110 and/or of VHR hydraulic actuator 1110, such as via flywheel bearing 328 of the respective flywheel 314.

Figure 6:
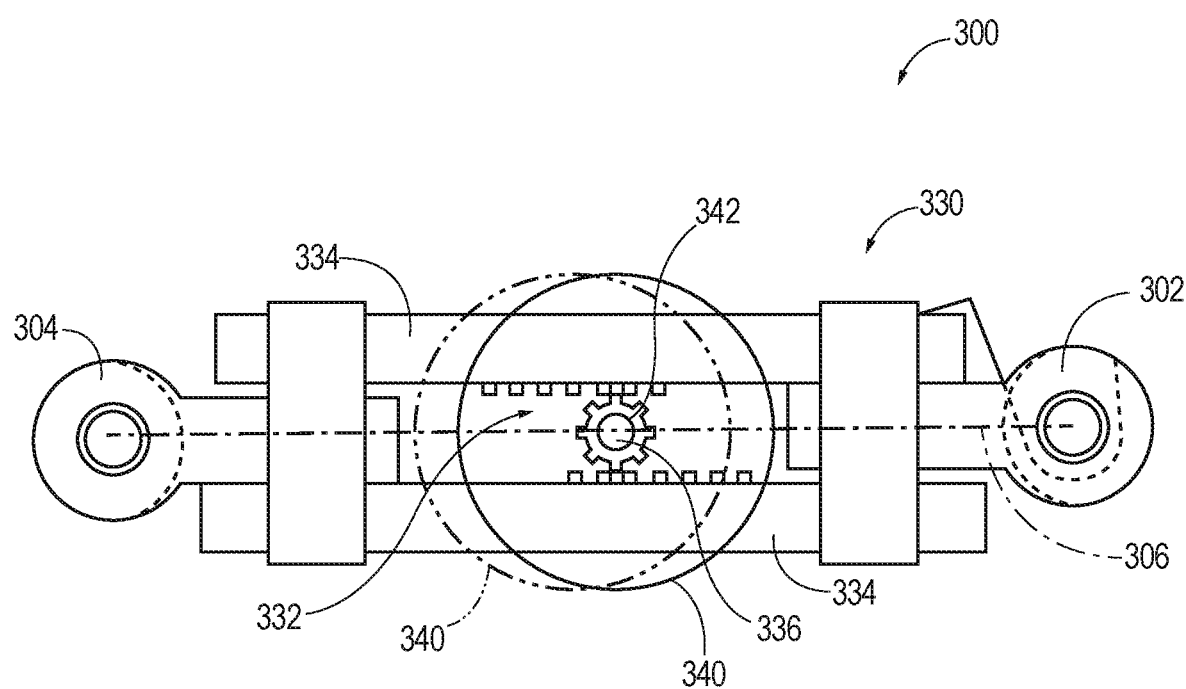
FIG. 6 is a side elevation view illustrating a portion of another example of an inerter according to the present disclosure.

FIG. 6 illustrates another inerter 300 that includes a dual rack and pinion structure with a circular pinion that engages two linear gear racks. Rotational motion applied to the pinion causes the racks to move relative to each other and relative to the pinion, thus translating the rotational motion of the pinion into linear motion. Specifically, in the example of FIG. 6, inerter 300 includes a flexible holding structure 330 and a dual rack and pinion assembly 332 held or clamped by and between flexible holding structure 330. Dual rack and pinion assembly 332 includes dual racks 334 positioned opposite each other and at least substantially housed within and held or clamped by flexible holding structure 330. Racks 334 include a first rack 334 and a second rack 334 that each has teeth. Dual rack and pinion assembly 332 also includes a pinion 336, such as in the form of a pinion gear, engaged to and between the first and second racks 334. Pinion 336 has gear teeth configured to engage the teeth of the first and second racks 334. In some examples, first terminal 302 of inerter 300 is coupled to the first rack 334 and second terminal 304 of inerter 300 is coupled to the second rack 334.

Examples of inerter 300 that include dual rack and pinion assembly 332 further include a pair of inertia wheels 340. Inertia wheels 340 are each respectively positioned adjacent to opposite exterior sides of flexible holding structure 330. An axle element 342 extends through a first inertia wheel 340, flexible holding structure 330, pinion 336, and a second inertia wheel 340. In such examples, movement of first terminal 302 relative to second terminal 304 (such as due to a relative motion of flight control surface 20, VHR hydraulic actuator 1110, torque-generating hydraulic actuator 2110, and/or support structure 40) causes translational movement of first rack 334 relative to second rack 334 along inerter axis 306, thus causing rotational movement of pinion 336 and the pair of inertia wheels 340 such that the rotational movement of pinion 336 is resisted by the pair of inertia wheels 340 and there is no incidental motion. This results in dual rack and pinion assembly 332 damping movement of flight control surface 20.

The motion of pinion 336 is resisted by inertia wheels 340 such that the change of orientation of racks 334 are just in relation to the inerter axis 306 by inducing a resistance force to the rotation of first terminal 302 connected to flight control surface 20. The resistance force is resisted by inertia wheels 340. Damping movement of flight control surface 20 provides increased flutter suppression, which in turn may result in an improved hydraulic application stability and an increased efficient flight control actuation by control surface actuator assembly 100.

Additional examples of inerters 300, and/or features and components thereof, that may be utilized in conjunction with control surface actuator assemblies 100 according to the present disclosure are disclosed in U.S. Pat. No. 10,088,006, in U.S. Patent Application Publication No. 2019/0048959, in U.S. Pat. No. 10,107,347, and in U.S. Pat. No. 10,352,389, the complete disclosures of which are hereby incorporated by reference for all purposes.

As discussed, each hydraulic actuator 110 (such as VHR hydraulic actuator 1110 and/or torque-generating hydraulic actuator 2110) operates by utilizing the respective hydraulic valve 200 to flow hydraulic fluid 81 into and out of the respective first chamber 124 and the respective second chamber 128 to regulate a motion of the respective piston 142 and the respective rod 140 relative to the respective hydraulic actuator housing 120. Each hydraulic valve 200 may have any appropriate structure and/or functionality, such as may be known to the art of hydraulic systems. Examples of hydraulic valves 200 are schematically illustrated in FIGS. 2-3, while FIGS. 7-9 provide more detailed schematic representations of hydraulic valves 200.

In some examples, and as schematically illustrated in FIGS. 2-3 and 7-9, the respective hydraulic valve 200 of torque-generating hydraulic actuator 2110 and/or of VHR hydraulic actuator 1110 includes a fluid input 242 configured to receive a high-pressure hydraulic fluid flow and a fluid return 246 configured to discharge a low-pressure hydraulic fluid flow. Hydraulic valve 200 further includes a first outlet 250 that is fluidly connected to first chamber 124 of the respective hydraulic actuator housing 120 and a second outlet 252 that is fluidly connected to second chamber 128 of the respective hydraulic actuator housing 120.

Figure 7:
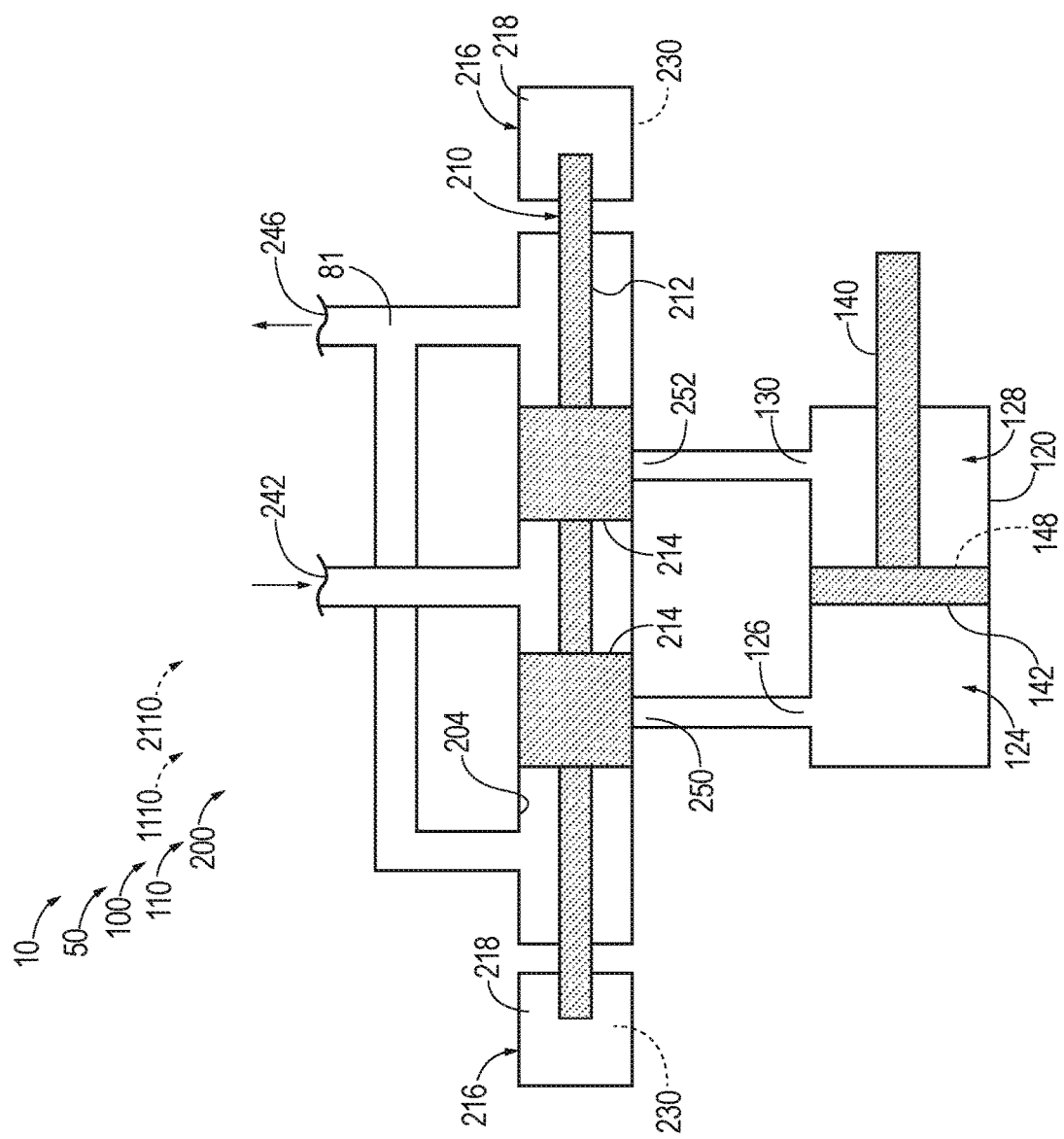
FIG. 7 is a schematic representation of examples of hydraulic valves with a single spool according to the present disclosure.
Figure 8:
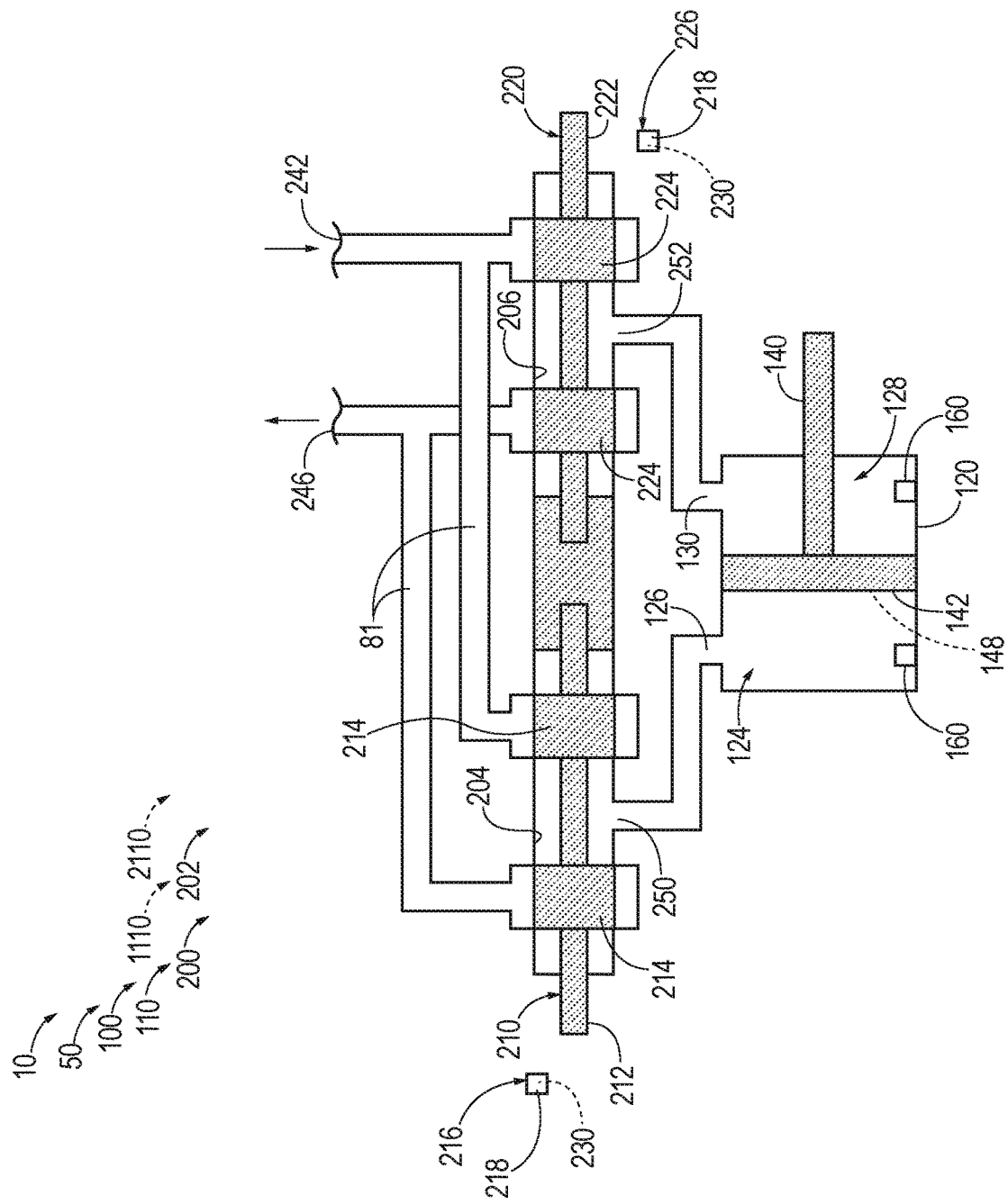
FIG. 8 is a schematic representation of examples of dual-spool hydraulic valves according to the present disclosure.
Figure 9:
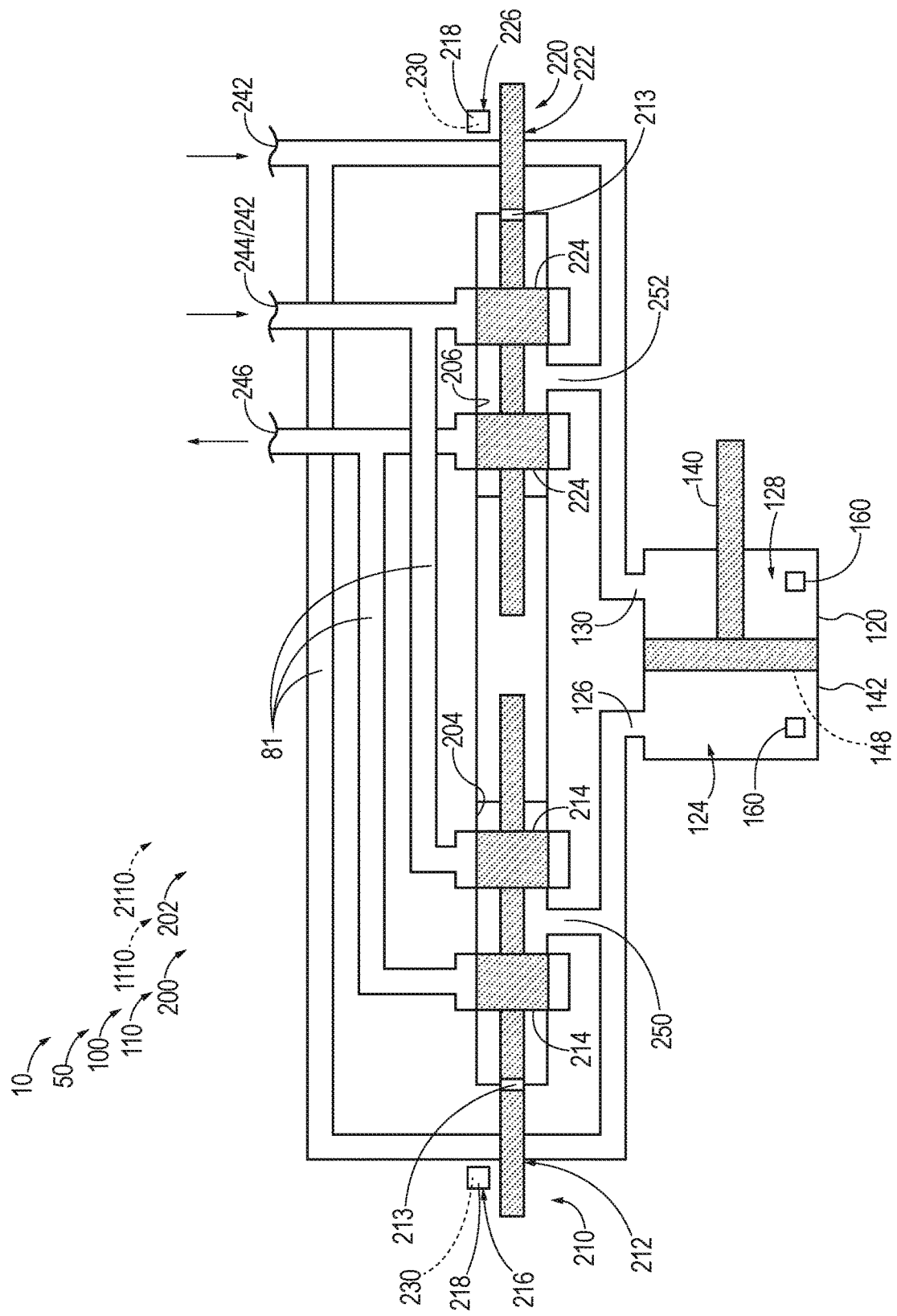
FIG. 9 is a schematic representation of examples of dual-spool hydraulic valves that include a fluid boost input according to the present disclosure.

In some examples, and as illustrated in FIGS. 7-9, hydraulic valve 200 includes a spool manifold 204 that is selectively fluidly connected to two or more of fluid input 242, fluid return 246, first outlet 250, and second outlet 252, as well as a spool 210 positioned at least substantially within spool manifold 204. In such examples, spool 210 includes a spool shaft 212 and one or more spool blocks 214 mounted on spool shaft 212, as well as a spool actuator 216 configured to selectively translate spool 210 relative to spool manifold 204. More specifically, in such examples, hydraulic valve 200 is configured such that selectively translating spool 210 relative to spool manifold 204 operates to selectively fluidly interconnect fluid input 242, fluid return 246, first outlet 250, and second outlet 252 to regulate a flow of hydraulic fluid 81 between fluid input 242, fluid return 246, first outlet 250, and second outlet 252. In this manner, translating spool 210 relative to spool manifold 204 operates to vary the respective pressures of hydraulic fluid 81 within first chamber 124 and second chamber 128 to selectively translate piston 142 and rod 140 within hydraulic actuator housing 120.

Spool actuator 216 may be configured to selectively translate spool 210 relative to spool manifold 204 in any appropriate manner. For example, in some examples, and as illustrated in FIGS. 7-9, spool actuator 216 includes and/or is a solenoid 218 that is selectively energized to selectively translate spool 210. In some examples, solenoid 218 is controlled by controller 90 and provides for positioning spool 210 within spool manifold 204. Additionally or alternatively, hydraulic valve 200 may include and/or be a servo valve that includes a servo feedback system 230. In some such examples, and as illustrated in FIGS. 7-9, control surface actuator assembly 100 and/or hydraulic valve 200 includes a piston position sensor 148 configured to generate a piston position measurement that represents a position of piston 142 relative to hydraulic actuator housing 120. In such examples, hydraulic valve 200 is configured to regulate the flow of hydraulic fluid 81 at least partially based upon the piston position measurement, such as via control of solenoid 218 via servo feedback system 230.

Hydraulic valve 200 may have any appropriate configuration and/or functionality, such as may be known to the field of hydraulic systems. For example, FIG. 7 illustrates an example in which hydraulic valve 200 is a four-way three-position hydraulic valve 200 with a single spool 210. However, this is not required, and it is additionally within the scope of the present disclosure that hydraulic valve 200 is a dual-spool hydraulic valve 202 that includes two distinct spools 210. In some examples, and as discussed in more detail herein, dual-spool hydraulic valve 202 additionally includes a fluid boost input 244 that is configured to receive a flow of hydraulic fluid 81 at the boost pressure. As discussed in more detail herein, utilizing dual-spool hydraulic valves 202 may enable energy regeneration within hydraulic valve 200 in certain operational regimes, thereby reducing the peak power demand of aircraft hydraulic system 50 relative to examples in which each hydraulic valve 200 includes only a single spool 210.

FIGS. 8-9 illustrate examples of dual-spool hydraulic valves 202. As illustrated in FIGS. 8-9, in an example in which hydraulic valve 200 is dual-spool hydraulic valve 202, spool manifold 204 is a first spool manifold 204, spool 210 of dual-spool hydraulic valve 202 is a first spool 210 with a first spool shaft 212 and one or more first spool blocks 214, and spool actuator 216 is a first spool actuator 216 configured to selectively translate first spool 210 relative to first spool manifold 204. In contrast to a single-spool hydraulic valve 200, and as illustrated in FIGS. 8-9, dual-spool hydraulic valve 202 additionally includes a second spool manifold 206 and a second spool 220 positioned at least substantially within second spool manifold 206. In such examples, second spool 220 includes a second spool shaft 222 and one or more second spool blocks 224 mounted on second spool shaft 222, and dual-spool hydraulic valve 202 further includes a second spool actuator 226 configured to selectively translate second spool 220 relative to second spool manifold 206 and independent of first spool 210. That is, each of first spool 210 and second spool 220 is individually controllable and can be positioned regardless of the position of the opposing spool. In such examples, dual-spool hydraulic valve 202 is configured such that translating each of first spool 210 and second spool 220 operates to regulate a flow of hydraulic fluid 81 between fluid input 242, fluid return 246, first outlet 250, and second outlet 252 to vary the respective pressures of hydraulic fluid 81 within first chamber 124 and second chamber 128 of hydraulic actuator housing 120 to selectively translate piston 142 and rod 140 within hydraulic actuator housing 120. First spool 210 and second spool 220 may include the same or different shapes and/or sizes. In some examples, first spool 210 and second spool 220 have at least substantially the same shape and size.

Each of first spool manifold 204 and second spool manifold 206 may be selectively fluidly connected to two or more of fluid input 242, fluid boost input 244, fluid return 246, first outlet 250, and second outlet 252. Specifically, each of first spool manifold 204 and second spool manifold 206 may be described as "selectively" fluidly connecting two or more components when the respective first spool 210 or second spool 220 is positioned so as not to restrict such fluid communication. As examples, FIGS. 8-9 illustrate examples in which first spool manifold 204 is selectively fluidly connected to first chamber 124 via first outlet 250 and in which second spool manifold 206 is selectively fluidly connected to second chamber 128 via second outlet 252. Additionally, FIG. 8 illustrates an example in which each of first spool manifold 204 and second spool manifold 206 is fluidly connected to each of fluid input 242 and fluid return 246, while FIG. 9 illustrates an example in which each of first spool manifold 204 and second spool manifold 206 is fluidly connected to each of fluid boost input 244 and fluid return 246.

In some examples, dual-spool hydraulic valve 202 is configured such that dual-spool hydraulic valve 202 remains functional to operatively translate the respective rod 140 relative to the respective hydraulic actuator housing 120 even when first spool actuator 216 or second spool actuator 226 is disabled. In this manner, utilizing dual-spool hydraulic valve 202 provides a level of redundancy that may augment an overall reliability and/or robustness of dual-spool hydraulic valve 202 and/or of control surface actuator assembly 100.

As discussed, and as shown in FIGS. 8-9, dual-spool hydraulic valve 202 is configured to selectively enable fluid communication between fluid input 242 and one of first outlet 250 and second outlet 252, as well as to enable fluid communication between fluid return 246 and the other of first outlet 250 and second outlet 252. However, in contrast to a single-spool hydraulic valve 200, some examples of dual-spool hydraulic valve 202 are configured to selectively enable fluid communication between first outlet 250 and second outlet 252, as described in more detail below.

As discussed, some examples of aircraft hydraulic system 50 include boost pump 56 that is configured to pressurize hydraulic fluid 81 to a boost pressure that is greater than the base pressure provided by central pump 54. In some such examples, and as schematically illustrated in FIGS. 2-3 and less schematically illustrated in FIG. 9, dual-spool hydraulic valve 202 additionally includes fluid boost input 244 that is configured to receive a flow of hydraulic fluid 81 at the boost pressure. In some such examples, and as schematically illustrated in FIG. 2, boost pump 56 supplies the hydraulic fluid flow to fluid boost input 244, while central pump 54 supplies the hydraulic fluid flow to fluid input 242. In some examples, and as further illustrated in FIGS. 3 and 9, hydraulic actuator 110 and/or hydraulic actuator housing 120 includes a pressure sensor 160 positioned in first chamber 124 and/or in second chamber 128, each pressure sensor 160 configured to generate a pressure signal that indicates a pressure of hydraulic fluid 81 within the corresponding chamber of hydraulic actuator housing 120. Each pressure sensor 160 may include and/or be any appropriate sensor, such as a pressure transducer. In such examples, dual-spool hydraulic valve 202 is configured to selectively fluidly connect fluid boost input 244 to first outlet 250 and/or to second outlet 252 based, at least in part, on the pressure signal. In some such examples, and as illustrated in FIG. 9, one or both of first spool shaft 212 and second spool shaft 222 defines a shaft orifice 213 through which hydraulic fluid 81 may flow. Specifically, in such examples, each shaft orifice 213 may enable direct fluid communication between fluid input 242 and first chamber 124 or second chamber 128 when the respective spool shaft is appropriately positioned.

Figure 10:
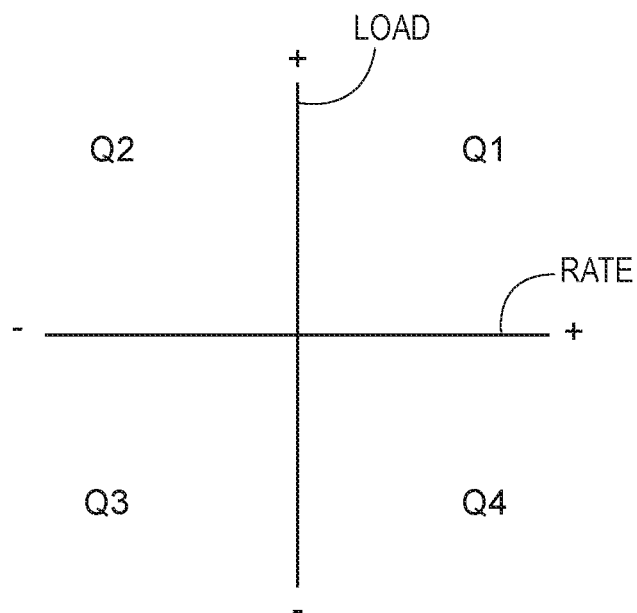
FIG. 10 is a diagram representing operational quadrants of a hydraulic actuator according to the present disclosure.

FIG. 10 illustrates a diagram of the forces acting on piston 142 that is operatively and/or dynamically coupled to flight control surface 20 and that affect the required movement of hydraulic fluid 81 through aircraft hydraulic system 50. Specifically, in FIG. 10, a first axis (i.e., the x-axis) represents the rate of movement of piston 142 and thus of flight control surface 20. As shown in FIG. 10, the rate may be either positive (e.g., when piston 142 and/or flight control surface 20 moves in a first direction) or negative (e.g., when piston 142 and/or flight control surface 20 moves in a second direction that is opposite the first direction). The second axis (i.e., the y-axis) represents the load exerted upon piston 142 through flight control surface 20. As shown in FIG. 10, the load may be positive (e.g., when applied to piston 142 and/or to flight control surface 20 in a first direction) or negative (e.g., when applied to piston 142 and/or to flight control surface 20 in a second direction that is opposite the first direction). The diagram of FIG. 10 includes the four quadrants labeled Q1, Q2, Q3, and Q4, corresponding to the four combinations of rate and load directionality.

Figure 11:
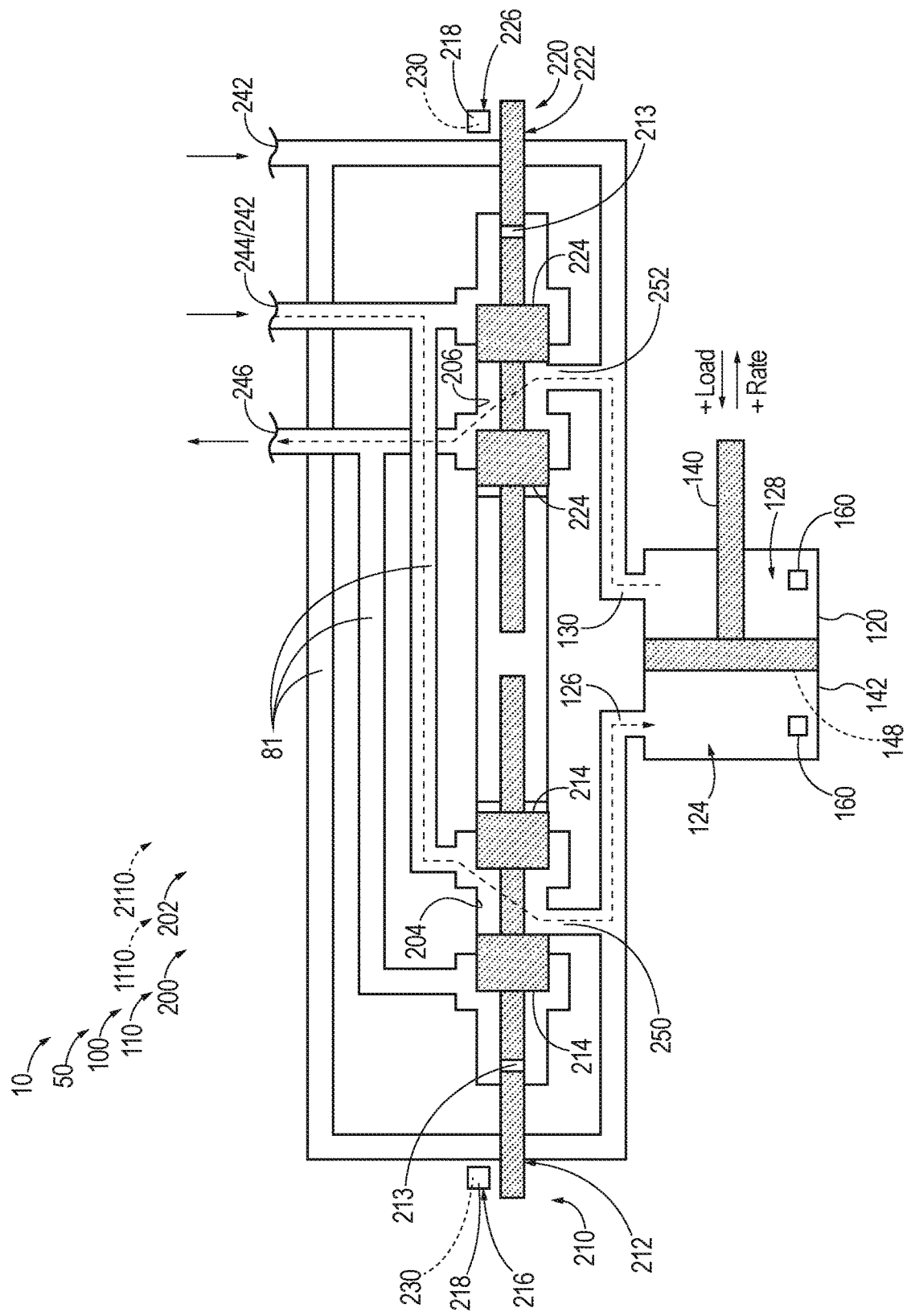
FIG. 11 is a schematic representation of examples of dual-spool hydraulic valves operating in a first quadrant of operation according to the present disclosure.

FIG. 11 illustrates an example of hydraulic actuator 110 with dual-spool hydraulic valve 202 within the first quadrant Q1 with a positive load applied to piston 142 and a positive rate. In the first quadrant Q1, the rate is controlled by the flow of hydraulic fluid 81 through fluid boost input 244 and into first chamber 124. As illustrated, first spool 210 is positioned relative to first spool manifold 204 in a second position for hydraulic fluid 81 from fluid input 242 to enter into first chamber 124. Second spool 220 is positioned relative to second spool manifold 206 in a position to maximize flow area and allow hydraulic fluid 81 to exit second chamber 128 and flow to fluid return 246.

Figure 12:
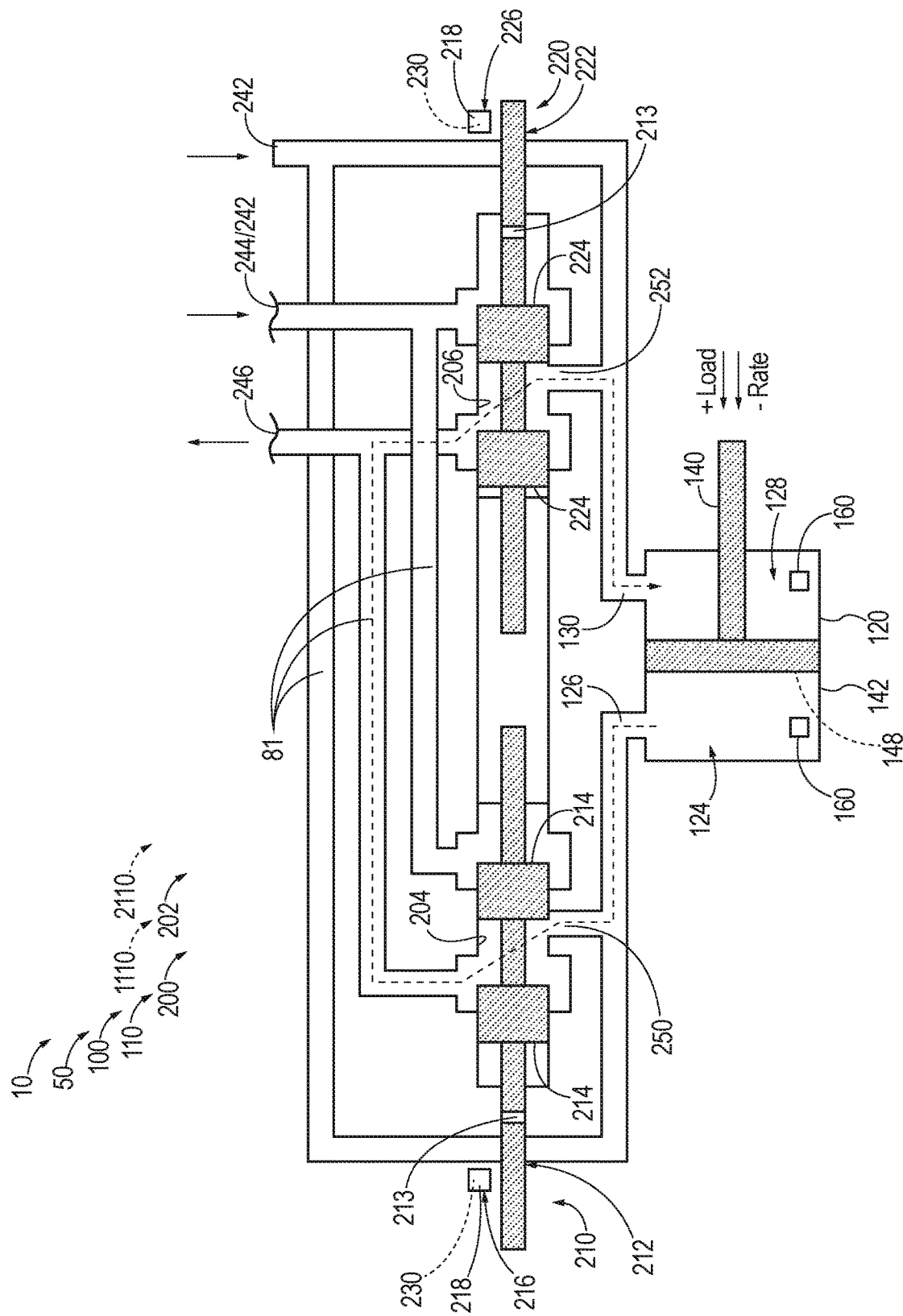
FIG. 12 is a schematic representation of examples of dual-spool hydraulic valves operating in a second quadrant of operation according to the present disclosure.

FIG. 12 illustrates an example of hydraulic actuator 110 with dual-spool hydraulic valve 202 within the second quadrant Q2 having a positive load applied to piston 142 and a negative rate. In the second quadrant Q2, the rate is controlled by the flow of hydraulic fluid 81 out of first chamber 124. Instead of outputting hydraulic fluid 81 from first chamber 124 to fluid return 246, the exiting hydraulic fluid 81 is directed from first chamber 124 to second chamber 128. Regenerating hydraulic fluid 81 from first chamber 124 to second chamber 128 reduces the number of pressure cycles that are required to otherwise introduce hydraulic fluid 81 into second chamber 128 of hydraulic actuator 110 from fluid input 242 and move hydraulic fluid 81 into and through fluid return 246. In the configuration illustrated in FIG. 12, first spool 210 and second spool 220 are positioned to allow hydraulic fluid 81 from first chamber 124 to move to second chamber 128. Second spool 220 is positioned relative to second spool manifold 206 in a position to maximize flow area. The movement of hydraulic fluid 81 to second chamber 128 may be caused by a pressure drop in second chamber 128 due to the movement of piston 142 towards first chamber 124.

Figure 13:
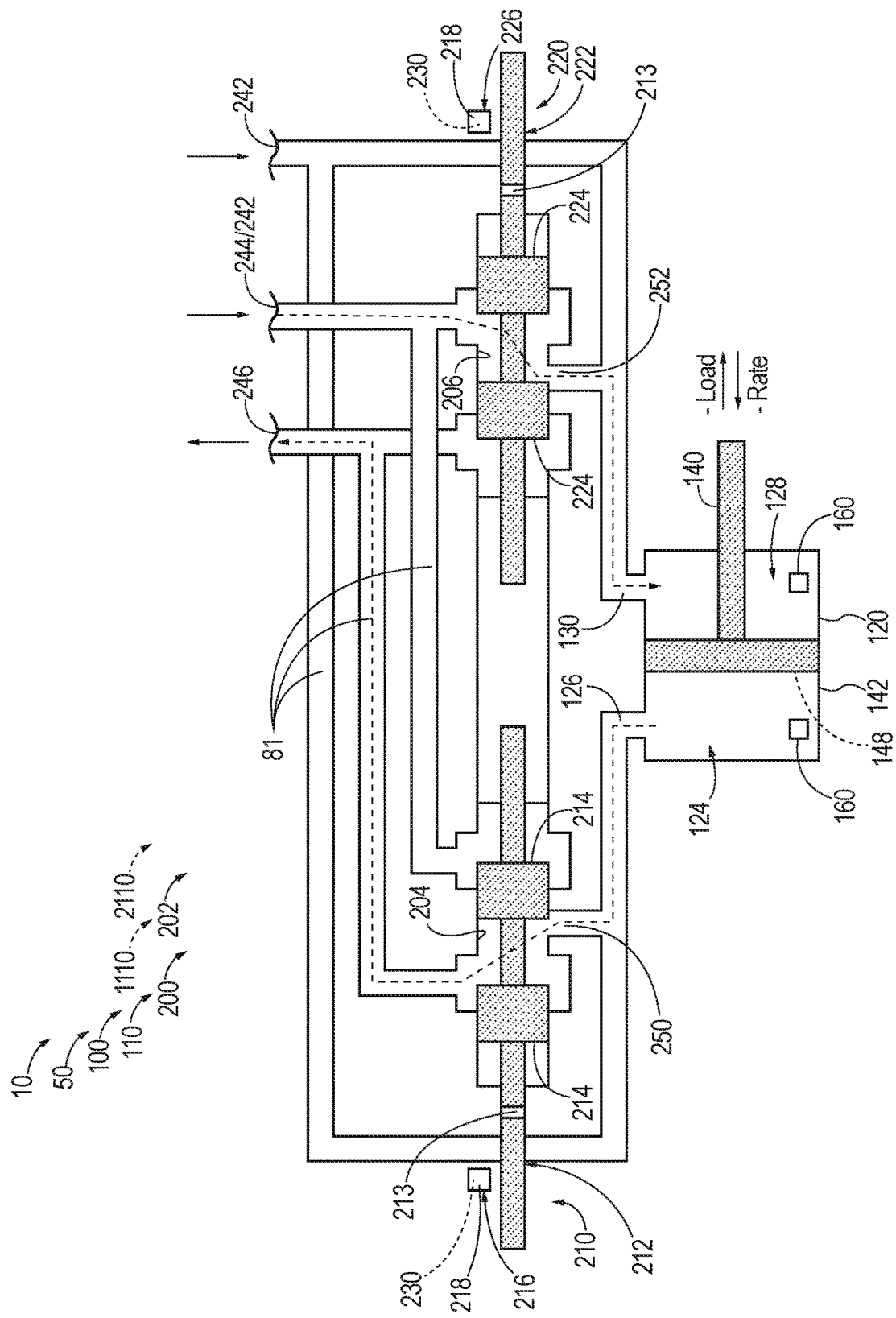
FIG. 13 is a schematic representation of examples of dual-spool hydraulic valves operating in a third quadrant of operation according to the present disclosure.

FIG. 13 illustrates an example of hydraulic actuator 110 with dual-spool hydraulic valve 202 within the third quadrant Q3 having a negative load applied to piston 142 and a negative rate. In the third quadrant Q3, the rate is controlled by the flow of hydraulic fluid 81 into second chamber 128 from fluid input 242. In the example of FIG. 13, second spool 220 is positioned relative to second spool manifold 206 for hydraulic fluid 81 from fluid input 242 to move into second chamber 128, and first spool 210 is positioned relative to first spool manifold 204 in a position to maximize flow area and to allow hydraulic fluid 81 to exit first chamber 124 and flow to fluid return 246.

Figure 14:
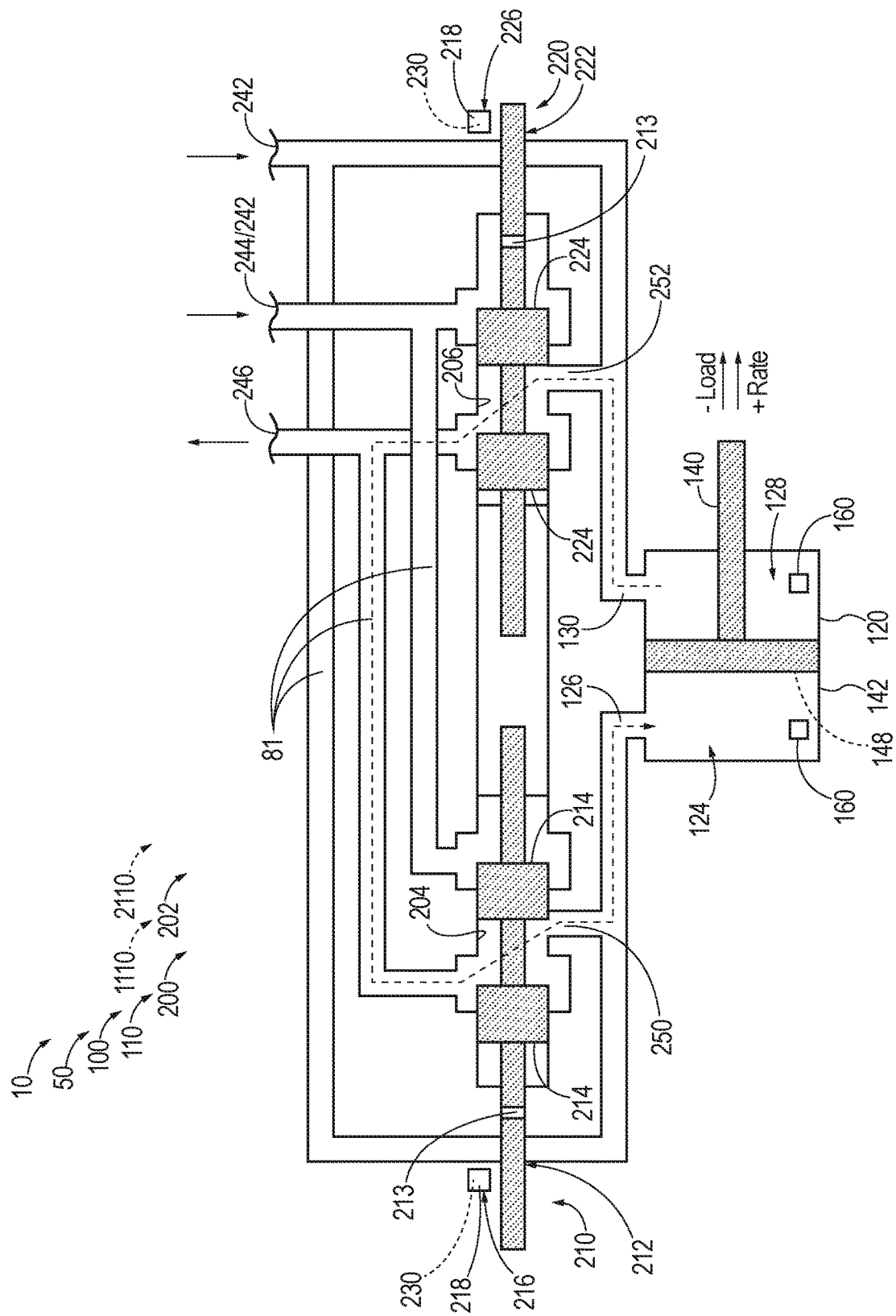
FIG. 14 is a schematic representation of examples of dual-spool hydraulic valves operating in a fourth quadrant of operation according to the present disclosure.

FIG. 14 illustrates an example of hydraulic actuator 110 with dual-spool hydraulic valve 202 within the fourth quadrant Q4 with a negative load applied to piston 142 and a positive rate. In the fourth quadrant Q4, the rate is controlled by the flow of hydraulic fluid 81 out of second chamber 128. In the example of FIG. 14, second spool 220 is positioned relative to second spool manifold 206 to allow hydraulic fluid 81 to flow out of second chamber 128, and first spool 210 is positioned relative to first spool manifold 204 for hydraulic fluid 81 to move into first chamber 124. Similar to the example of FIG. 12, this configuration regenerates the existing hydraulic fluid 81 within hydraulic actuator 110 and thus reduces the number of needed pressure cycles to move hydraulic fluid 81 through fluid input 242 into hydraulic actuator 110 and out of hydraulic actuator 110 and through fluid return 246. In the configuration illustrated in FIG. 12, first spool 210 and second spool 220 are positioned to allow hydraulic fluid 81 from second chamber 128 to move to first chamber 124. First spool 210 is positioned relative to first spool manifold 204 in a position to maximize flow area. The movement of hydraulic fluid 81 to first chamber 124 may be caused by a pressure drop in first chamber 124 due to the movement of piston 142 towards second chamber 128.

Dual-spool hydraulic valve 202 provides for controller 90 to operatively control examples of hydraulic actuator 110 that include dual-spool hydraulic valve 202 in all four quadrants of operation. Specifically, controller 90 controls each solenoid 218 to position first spool 210 and second spool 220 accordingly to provide for the control. In some examples, a boost is supplied by hydraulic fluid 81 entering through fluid input 242. In the following discussion, P denotes the pressure of hydraulic fluid 81 entering through fluid input 242, T denotes the pressure of hydraulic fluid 81 exiting through fluid return 246, A denotes the pressure of hydraulic fluid 81 in first chamber 124, and B denotes the pressure of hydraulic fluid 81 in second chamber 128.

For operation in the first quadrant Q1 (see FIG. 11), control occurs through hydraulic fluid 81 entering first chamber 124 through fluid boost input 244. This includes the movement of hydraulic fluid 81 from fluid input 242 to first chamber 124 (due to the pressure differential P-A) and the movement of hydraulic fluid 81 from second chamber 128 to fluid return 246 (due to the pressure differential B-T). A boost is applied when the pressure at fluid input 242 is less than the pressure at first chamber 124 plus a margin (i.e., when P≥A-δP). The margin δP provides for application of the load above the required pressure to account for various forces on hydraulic fluid 81, such as surface friction and surface-inertia acceleration. The pressure of hydraulic fluid 81 in second chamber 128 contributes to the required margin δP and peak power demand. In an example, the system pressure is 1200 psi and the margin δP is 300 psi.

For operation in the second quadrant Q2, no boost is required from hydraulic fluid 81 entering through fluid input 242 since the pressure A in first chamber 124 is greater than or equal to the pressure B in second chamber 128 (i.e., A≥B). Control in the second quadrant Q2 occurs through hydraulic fluid 81 exiting first chamber 124 and entering second chamber 128 (due to the pressure differential A-B which is minimized by maximizing the flow area into second chamber 128).

For operation in the third quadrant Q3, control occurs through the movement of hydraulic fluid 81 from fluid input 242 into second chamber 128 due to the pressure differential (P−B) and movement of hydraulic fluid 81 from first chamber 124 to fluid return 246 (due to the pressure differential A-T). A boost is applied when the pressure at fluid input 242 is less than the pressure at second chamber 128 plus the margin (i.e., when P≥BδP). The pressure of hydraulic fluid 81 in first chamber 124 contributes to the required margin δP.

For operation in the fourth quadrant Q4, no boost is required from hydraulic fluid 81 entering through fluid input 242 since the pressure B in second chamber 128 is greater than or equal to the pressure A in first chamber 124 (i.e., BA). Control in the fourth quadrant Q4 occurs through hydraulic fluid 81 exiting second chamber 128 and entering the first chamber 124 (due to the pressure differential B-A, which is minimized by maximizing the flow area into the first chamber 124).

In each of the quadrants, and as illustrated in FIGS. 11-14, first spool shaft 212 of first spool 210 and second spool shaft 222 of second spool 220 block first chamber 124 and second chamber 128 from being fluidly coupled to the right-hand fluid input 242. However, in some examples, shaft orifice 213 of first spool shaft 212 and/or of second spool shaft 222 may be aligned with a corresponding hydraulic conduit 80 to enable such fluid communication.

In some examples, upon detecting a failure in dual-spool hydraulic valve 202, controller 90 may revert to a non-differential control mode of dual-spool hydraulic valve 202. In some such examples, this includes operating boost pump 56 at an intermediate pressure of 5000 psi, such as may be well below a peak capability of boost pump 56 of 8000-9000 psi. In such examples, central pump 54 may be operated at 3000 psi rather than 1200 psi.

In an example in which dual-spool hydraulic valve 202 experiences a failure of second spool actuator 226, second spool 220 assumes a third position relative to second spool manifold 206 in which shaft orifice 213 of second spool shaft 222 is aligned with the corresponding hydraulic conduit 80. This positioning allows for the flow of hydraulic fluid 81 through shaft orifice 213 and into and out of second chamber 128. In some examples, second spool 220 is biased towards the third position. Accordingly, in such examples, in the event of a failure associated with second spool 220, second spool actuator 226 (e.g., the associated solenoid 218) may be de-energized, causing second spool 220 to assume the third position. The third position also may include second spool 220 being positioned to fluidly isolate second chamber 128 from fluid boost input 244 and/or from fluid return 246. In such examples, first spool 210 remains operable to control the flow of hydraulic fluid 81 into and out of first chamber 124.

Further examples of aircraft hydraulic systems 50 and/or of dual-spool hydraulic valves 202 that may be utilized in conjunction with aircraft hydraulic systems 50 and/or with control surface actuator assemblies 100 according to the present disclosure are disclosed in U.S. Patent Application Publication No. 2019/0315456, U.S. Patent Application Publication No. 2019/0316606, and U.S. Patent Application Publication No. 2019/0316607, the complete disclosures of which are hereby incorporated by reference for all purposes.

In some examples, operative use of control surface actuator assembly 100 includes utilizing hydraulic actuator 110 that includes dual-spool hydraulic valve 202 to reduce a peak power demand of aircraft hydraulic system 50, such as to reduce the pressure loss due to metering flow into and out of first chamber 124 and second chamber 128 of hydraulic actuator 110 at a maximum flow area to achieve a minimum margin δP for the chamber port which is not controlling rate for a given quadrant. However, in some cases, increasing a port area of dual-spool hydraulic valve 202 may introduce an undesirable degree of flutter susceptibility or response in flight control surface 20 during flight. Stated differently, flight control surface 20 may be characterized by a resonance condition in which flutter may occur, and metering flow into and out of first chamber 124 and second chamber 128 of hydraulic actuator 110 at the maximum flow area to achieve the minimum margin δP may cause the operational bandwidth of control surface actuator assembly 100 to overlap with such a resonance condition. In such examples, the flutter of flight control surface 20 may be mitigated and/or minimized by utilizing a mechanism for damping an oscillation of flight control surface 20. Accordingly, in some examples, and as discussed above in the context of FIGS. 2-6, control surface actuator assembly 100 additionally includes one or more inerters 300 for damping a motion of one or more components of control surface actuator assembly 100. In such examples, and as discussed, each inerter 300 is configured to resist an acceleration of the respective first terminal 302 relative to the respective second terminal 304. Accordingly, in such examples, inerter 300 may operate to provide critical damping of an oscillation of flight control surface 20, thus expanding the practical operational bandwidth of control surface actuator assembly 100 to include metering flow into and out of first chamber 124 and second chamber 128 of hydraulic actuator 110 at a maximum flow area to achieve a minimum margin δP, and to lower peak power demand of the aircraft hydraulic system 50.

Figure 15:
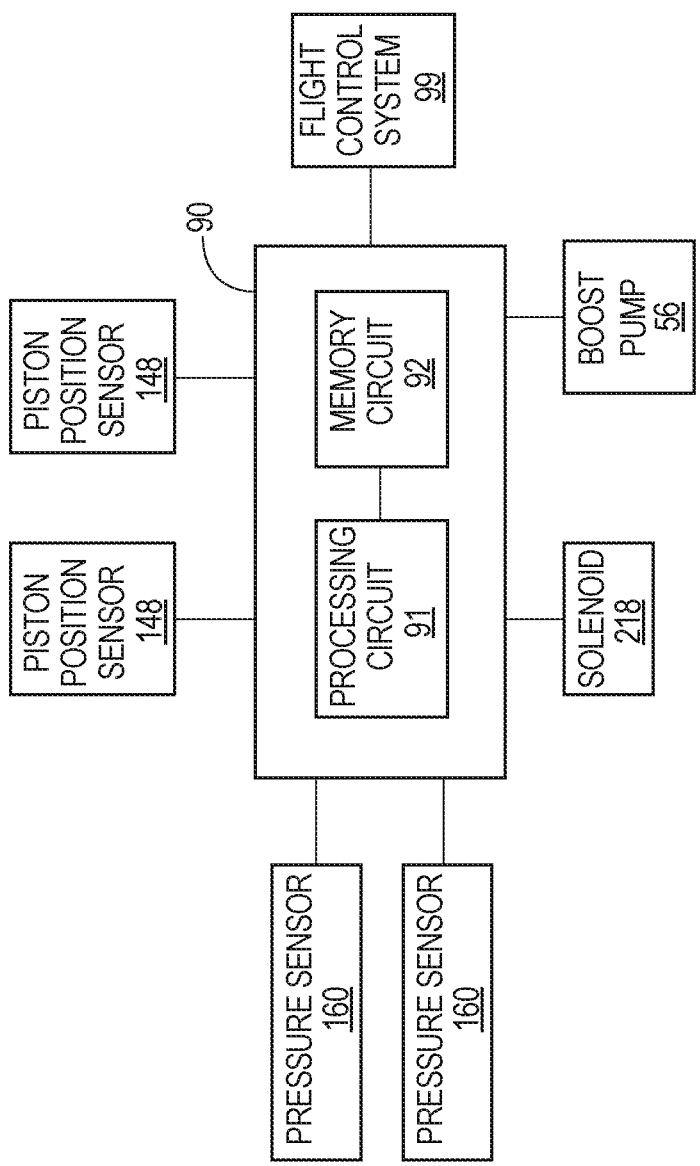
FIG. 15 is a schematic representation of examples of controllers according to the present disclosure.

FIG. 15 is a schematic representation of an example of controller 90 for controlling one or more aspects of aircraft hydraulic system 50 and/or control surface actuator assembly 100. As shown in FIG. 15, in some examples, controller 90 includes one or more processing circuits (shown as processing circuit 91) that may include one or more microprocessors, Application Specific Integrated Circuits (ASICs), or the like, configured with appropriate software and/or firmware. A computer readable storage medium (shown as memory circuit 92) stores data and computer readable program code that configures the processing circuit 91 to implement the techniques described above. Memory circuit 92 is a non-transitory computer readable medium, and may include various memory devices such as random access memory, read-only memory, and flash memory.

Controller 90 may receive signals from sensors associated with aircraft hydraulic system 50 and/or with control surface actuator assembly 100, such as piston position sensor 148 and/or pressure sensor 160. In some examples, controller 90 can communicate with a flight control system 99 that controls one or more functions of the aircraft 10. In such examples, flight control system 99 can provide various data to the controller 90, such as but not limited to the commanded movements of flight control surface 20. In some examples, controller 90 additionally controls the movement of hydraulic fluid 81 through aircraft hydraulic system 50 to position flight control surface 20 in its commanded position. In such examples, controller 90 utilizes inputs from piston position sensor(s) 148 and/or pressure sensor(s) 160 to control boost pump 56 and/or accumulator 70 to supply the needed hydraulic fluid 81.

Controller 90 may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

Figure 16:
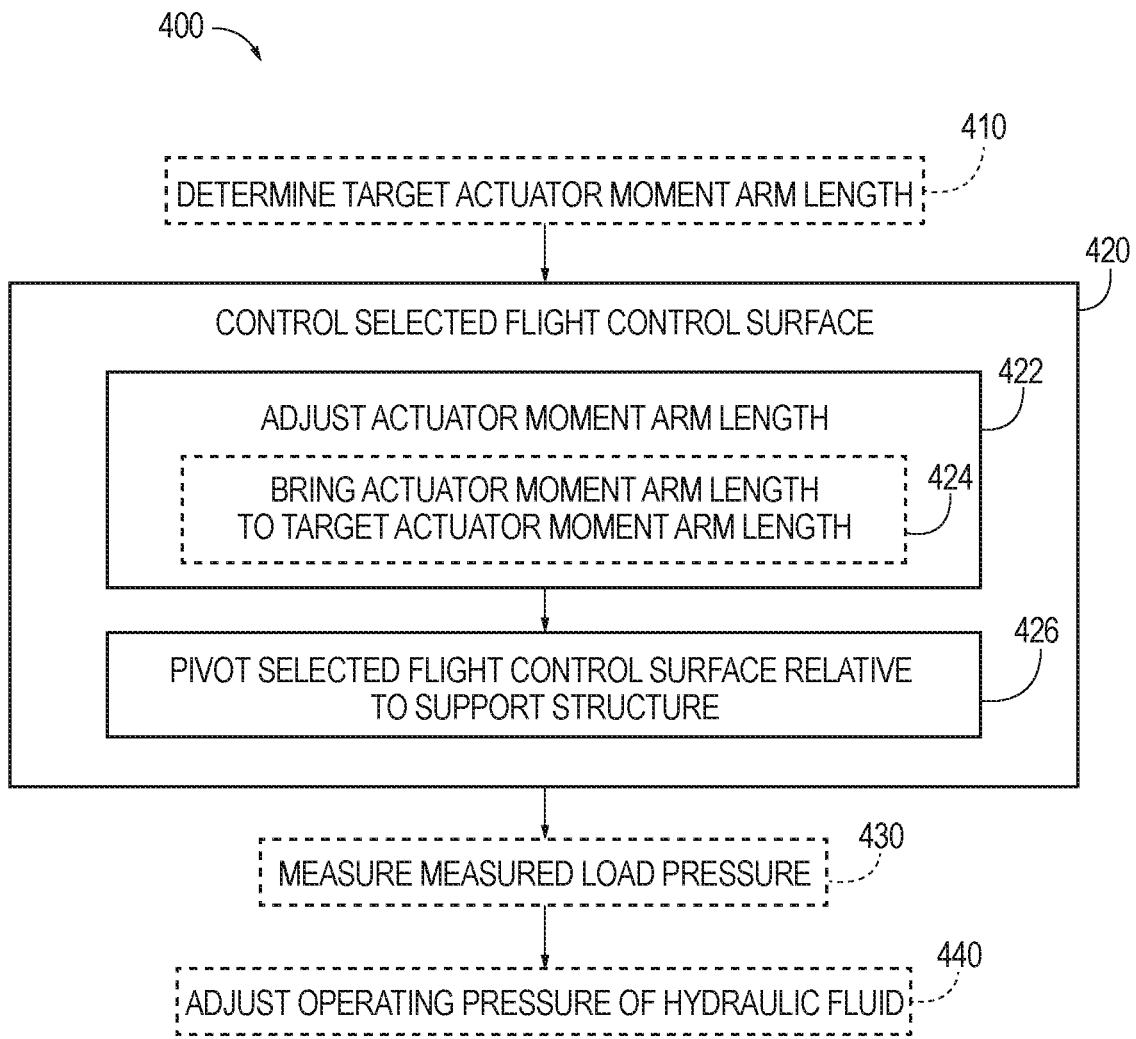
FIG. 16 is a flowchart depicting methods of operating one or more flight control surfaces of an aircraft according to the present disclosure.

FIG. 16 is a flowchart depicting methods 400, according to the present disclosure, of operating one or more flight control surfaces of an aircraft (such as flight control surface(s) 20 of aircraft 10). Specifically, methods 400 pertain to methods of utilizing a control surface actuator assembly (such as control surface actuator assembly 100) that includes a VHR hydraulic actuator (such as VHR hydraulic actuator 1110) that is coupled to the flight control surface and torque-generating hydraulic actuator (such as torque-generating hydraulic actuator 2110) that is pivotally coupled to the VHR hydraulic actuator, and in which an actuator moment arm length (such as actuator moment arm length 30) of the VHR hydraulic actuator is selectively variable, as described herein. Methods 400 additionally pertain to methods of utilizing an aircraft hydraulic system (such as aircraft hydraulic system 50) that includes the control surface actuator assembly.

As shown in FIG. 16, method 400 includes controlling, at 420, with the control surface actuator assembly and the aircraft hydraulic system, a selected flight control surface of the one or more flight control surfaces. Specifically, and as shown in FIG. 16, the controlling the selected flight control surface at 420 includes adjusting, at 422, with the VHR hydraulic actuator, the actuator moment arm length corresponding to the selected flight control surface, and pivoting, at 426, with the torque-generating hydraulic actuator, the selected flight control surface relative to the support structure. In some examples, the adjusting the actuator moment arm length at 422 is performed prior to the pivoting the selected flight control surface at 426.

In some examples, methods 400 include regulating a pressure of hydraulic fluid (such as hydraulic fluid 81)

within one or more components of the control surface actuator assembly. For example, and as shown in FIG. 16, some examples of method 400 include measuring, at 430, a measured load pressure of the hydraulic fluid within a hydraulic actuator housing (such as the respective hydraulic actuator housing 120 of VHR hydraulic actuator 1110 and/or of torque-generating hydraulic actuator 2110). More specifically, in such examples, the measuring the measured load pressure at 430 includes measuring the load pressure with a pressure sensor (such as pressure sensor 160) in a first chamber (such as first chamber 124) and/or a second chamber (such as second chamber 128) of the hydraulic actuator housing. In some such examples, and as further shown in FIG. 16, method 400 further includes adjusting, at 440, with a hydraulic valve (such as the respective hydraulic valve 200 of VHR hydraulic actuator 1110 and/or of torque-generating hydraulic actuator 2110), an operating pressure of the hydraulic fluid within the respective hydraulic actuator housing. Specifically, in such examples, the adjusting the operating pressure of the hydraulic fluid at 440 is based, at least in part, on the measured load pressure as measured in the measuring the measured load pressure at 430. The adjusting the operating pressure of the hydraulic fluid at 440 may be performed in any appropriate manner as described herein, such as by utilizing a dual-spool hydraulic valve (such as dual-spool hydraulic valve 202) in conjunction with a central pump (such as central pump 54) and/or a boost pump (such as boost pump 56) to selectively vary the pressure of the hydraulic fluid supplied to the first chamber and/or the second chamber of the hydraulic actuator housing of the VHR hydraulic actuator and/or of the torque-generating hydraulic actuator.

The adjusting the actuator moment arm length at 422 may be based upon any appropriate factors and/or considerations. For example, the adjusting the actuator moment arm length at 422 may be performed selectively and/or dynamically to accommodate an anticipated and/or calculated load and/or torque requirement. In some examples, and as shown in FIG. 16, method 400 further includes, prior to the adjusting the actuator moment arm length at 422, determining, at 410, with a controller (such as controller 90), a target actuator moment arm length. In such examples, the adjusting the actuator moment arm length at 422 includes bringing, at 424, subsequent to the determining the target actuator moment arm length at 410, the actuator moment arm length of the selected flight control surface to the target actuator moment arm length. In such examples, the determining the target actuator moment arm length at 410 may be based upon any appropriate considerations and/or calculations. As an example, the determining the target moment arm length at 410 may be based, at least in part, on a machine learning algorithm. As a more specific example, the determining the target moment arm length at 410 may include training a machine learning algorithm by associating actual values of the moment arm length (e.g., as commanded during a flight maneuver) with a hydraulic pressure and/or power demand of the hydraulic system and utilizing such training with machine learning techniques to develop an algorithm that optimizes the determination of the target moment arm length based upon one or more predetermined figures of merit. In such examples, the training, development, and/or operative use of the machine learning algorithms may include utilizing any appropriate methods and/or techniques known to the field of machine-learning computing.

Additionally or alternatively, in some examples, the determining the target actuator moment arm length at 410 is based, at least in part, on an anticipated maneuver of the aircraft. As a more specific example, method 400 may be performed while the aircraft performs a known and/or defined maneuver (such as a banked turn, an elevation change, a pitch angle adjustment, a roll angle adjustment, a yaw adjustment, etc.) with which a corresponding known target actuator moment arm length is associated, such as may be selected to minimize a peak power demand of the hydraulic system. Thus, in such examples, the determining the target actuator moment arm length at 410 may include identifying the anticipated maneuver and hence identifying the corresponding known target actuator moment arm length.

In some examples, the determining the target actuator moment arm length at 410 additionally or alternatively is based, at least in part, on the measuring the measured load pressure at 430. Similarly, in some examples, the determining the target actuator moment arm length at 410 includes determining a value of the target actuator moment arm length that will bring a load pressure of the hydraulic fluid within the respective hydraulic actuator housing at least substantially to a target load pressure. In some such examples, the target load pressure may be based upon, or at least substantially equal to, a load pressure corresponding to one or more other flight control surfaces of the aircraft. More specifically, in some examples, the aircraft includes a plurality of flight control surfaces and a corresponding plurality of control surface actuator assemblies, and the target load pressure corresponds to a measured load pressure of the hydraulic fluid within the hydraulic actuator housing of the torque-generating hydraulic actuator and/or of the VHR hydraulic actuator of at least one other control surface actuator assembly (i.e., corresponding to a flight control surface other than the selected flight control surface).

Illustrative, non-exclusive examples of inventive subject matter according to the present disclosure are described in the following enumerated paragraphs:

A1. A control surface actuator assembly (100) for selectively pivoting a flight control surface (20) relative to a support structure (40) comprises:

a support structure (40);

a flight control surface (20) operatively coupled to the support structure (40) and configured to pivot relative to the support structure (40) about a control surface pivot axis (22);

a torque-generating hydraulic actuator (2110); and a variable horn radius (VHR) hydraulic actuator (1110) pivotally coupled to the torque-generating hydraulic actuator (2110) and operatively coupled to the flight control surface (20);

wherein each of the torque-generating hydraulic actuator (2110) and the VHR hydraulic actuator (1110) includes:

a respective hydraulic actuator housing (120) and a respective rod (140) that extends at least partially into the respective hydraulic actuator housing (120), wherein the respective rod (140) is configured to translate relative to the respective hydraulic actuator housing (120) along a respective actuator axis (122); and a respective hydraulic valve (200) that regulates a flow of a hydraulic fluid (81) relative to the respective hydraulic actuator housing (120) to control a position of the respective rod (140) relative to the respective hydraulic actuator housing (120);

wherein the torque-generating hydraulic actuator (2110) and the VHR hydraulic actuator (1110) are configured to pivot relative to one another about an actuator coupling axis (28); wherein the torque-generating hydraulic actuator (2110) is configured to apply a torque to the flight control surface (20) to pivot the flight control surface (20) relative to the support structure (40); and wherein the VHR hydraulic actuator (1110) is configured to selectively vary an actuator moment arm length (30), as measured between the control surface pivot axis (22) and the actuator coupling axis (28), to at least partially regulate the torque applied to the flight control surface (20) by the torque-generating hydraulic actuator (2110).

A2. The control surface actuator assembly (100) of paragraph A1, wherein the respective actuator axis (122) of the respective hydraulic actuator housing (120) of the torque-generating hydraulic actuator (2110) is a torque-generating actuator axis (2122); wherein the respective actuator axis (122) of the respective hydraulic actuator housing (120) of the VHR hydraulic actuator (1110) is a VHR actuator axis (1122); and wherein the VHR hydraulic actuator (1110) is configured to selectively translate the respective rod (140) of the VHR hydraulic actuator (1110) along the VHR actuator axis (1122) to vary the actuator moment arm length (30).

A3. The control surface actuator assembly (100) of any of paragraphs A1-A2, wherein the control surface actuator assembly (100) is configured such that a control surface torque angle (26), as measured between a/the torque-generating actuator axis (2122) and a/the VHR actuator axis (1122), is greater than 0 degrees and less than 180 degrees.

A4. The control surface actuator assembly (100) of paragraph A3, wherein, during operative use of the control surface actuator assembly (100), the control surface torque angle (26) is one or more of at least 30 degrees, at least 50 degrees, at least 70 degrees, at least 90 degrees, at least 110 degrees, at least 130 degrees, at least 150 degrees, at most 160 degrees, at most 140 degrees, at most 120 degrees, at most 100 degrees, at most 80 degrees, at most 60 degrees, and at most 40 degrees.

A5. The control surface actuator assembly (100) of any of paragraphs A1-A4, wherein the control surface actuator assembly (100) is configured to selectively vary a control surface deflection angle (24) of the flight control surface (20) relative to the support structure (40), as measured in a plane perpendicular to the control surface pivot axis (22), through an angular range of motion that is one or more of at least 5 degrees, at least 10 degrees, at least 20 degrees, at least 40 degrees, at least 60 degrees, at least 80 degrees, at most 90 degrees, at most 70 degrees, at most 50 degrees, at most 30 degrees, at most 15 degrees, and at most 7 degrees.

A6. The control surface actuator assembly (100) of any of paragraphs A1-A5, wherein the VHR hydraulic actuator (1110) is configured to selectively vary the actuator moment arm length (30) among a range of values defined between and including a minimum actuator moment arm length (30) and a maximum actuator moment arm length (30), and wherein the maximum actuator moment arm length (30) is one or more of at least 1.1 times the minimum actuator moment arm length (30), at least 1.3 times the minimum actuator moment arm length (30), at least 1.5 times the minimum actuator moment arm length (30), at least 2 times the minimum actuator moment arm length (30), at least 2.5 times the minimum actuator moment arm length (30), at most 3 times the minimum actuator moment arm length (30), at most 2.2 times the minimum actuator moment arm length (30), at most 1.7 times the minimum actuator moment arm length (30), and at most 1.2 times the minimum actuator moment arm length (30).

A7. The control surface actuator assembly (100) of any of paragraphs A1-A6, wherein the respective hydraulic actuator housing (120) of one or both of the torque-generating hydraulic actuator (2110) and the VHR hydraulic actuator (1110) is a hydraulic cylinder.

A8. The control surface actuator assembly (100) of any of paragraphs A1-A7, wherein each of the torque-generating hydraulic actuator (2110) and the VHR hydraulic actuator (1110) further includes a respective piston (142) that extends within the respective hydraulic actuator housing (120) to define a respective first chamber (124) and a respective second chamber (128) on opposite sides of the respective piston (142) within the respective hydraulic actuator housing (120); wherein the respective rod (140) extends from the respective piston (142) and out of the respective hydraulic actuator housing (120); and wherein a difference in the hydraulic pressure of the hydraulic fluid (81) in each of the respective first chamber (124) and the respective second chamber (128) operates to move the respective piston (142) within the respective hydraulic actuator housing (120) to translate the respective rod (140) along the respective actuator axis (122).

A9. The control surface actuator assembly (100) of paragraph A8, wherein one or both of the torque-generating hydraulic actuator (2110) and the VHR hydraulic actuator (1110) further includes a respective support rod (141) that extends from the respective piston (142) opposite the respective rod (140) and that is operatively coupled to the respective hydraulic actuator housing (120).

A10. The control surface actuator assembly (100) of any of paragraphs A8-A9, wherein the respective hydraulic actuator housing (120) of each of the torque-generating hydraulic actuator (2110) and the VHR hydraulic actuator (1110) includes a respective first chamber port (126) for flowing the hydraulic fluid (81) into and out of the respective first chamber (124) and a respective second chamber port (130) for flowing the hydraulic fluid (81) into and out of the respective second chamber (128).

A11. The control surface actuator assembly (100) of any of paragraphs A1-A10, wherein the respective hydraulic actuator housing (120) of the torque-generating hydraulic actuator (2110) is pivotally coupled to the support structure (40), and wherein the respective rod (140) of the torque-generating hydraulic actuator (2110) is pivotally coupled to the VHR hydraulic actuator (1110).

A12. The control surface actuator assembly (100) of any of paragraphs A1-A10, wherein the respective hydraulic actuator housing (120) of the toque-generating hydraulic actuator (2110) is pivotally coupled to the VHR hydraulic actuator (1110), and wherein the respective rod (140) of the torque-generating hydraulic actuator (2110) is pivotally coupled to the support structure (40).

A13. The control surface actuator assembly (100) of any of paragraphs A1-A12, wherein the respective hydraulic actuator housing (120) of the VHR hydraulic actuator (1110) is pivotally coupled to the torque-generating hydraulic actuator (2110), and wherein the respective rod (140) of the VHR hydraulic actuator (1110) is operatively coupled to the flight control surface (20).

A14. The control surface actuator assembly (100) of any of paragraphs A1-A12, wherein the respective hydraulic actuator housing (120) of the VHR hydraulic actuator (1110) is operatively coupled to the flight control surface (20), and wherein the respective rod (140) of the VHR hydraulic actuator (1110) is pivotally coupled to the torque-generating hydraulic actuator (2110).

A15. The control surface actuator assembly (100) of any of paragraphs A8-A14, wherein the respective piston (142) of each of the torque-generating hydraulic actuator (2110) and the VHR hydraulic actuator (1110) includes a respective first piston surface (144) with a respective first piston surface area that partially defines the respective first chamber (124) and a respective second piston surface (146) with a respective second piston surface area that partially defines the respective second chamber (128).

A16. The control surface actuator assembly (100) of paragraph A15, wherein the respective first piston surface area and the respective second piston surface area of one or both of the torque-generating hydraulic actuator (2110) and the VHR hydraulic actuator (1110) are at least substantially equal.

A17. The control surface actuator assembly (100) of any of paragraphs A15-A16, wherein the respective first piston surface area and the respective second piston surface area of the respective piston (142) of the respective hydraulic actuator housing (120) of one or both of the torque-generating hydraulic actuator (2110) and the VHR hydraulic actuator (1110) are unequal.

A18. The control surface actuator assembly (100) of any of paragraphs A1-A17, further comprising one or more inerters (300); wherein each inerter (300) of the one or more inerters (300) includes a respective first terminal (302) and a respective second terminal (304) that are configured to translate relative to one another along a respective inerter axis (306); and wherein each inerter (300) of the one or more inerters (300) is configured to resist an acceleration of the respective first terminal (302) relative to the respective second terminal (304).

A19. The control surface actuator assembly (100) of paragraph A18, wherein each of the one or more inerters (300) further includes:
a respective inerter housing (301);
a respective threaded shaft (322) that is coupled to the respective first terminal (302) and that terminates in a respective shaft free end (324); and
a respective inerter rod (308) that is coupled to the respective second terminal (304) such that the respective inerter rod (308) and the respective second terminal (304) are configured to translate relative to the respective first terminal (302) along the respective inerter axis (306) in unison;
wherein each of the respective inerter rod (308) and the respective threaded shaft (322) extend at least partially within the respective inerter housing (301).

A20. The control surface actuator assembly (100) of paragraph A19, wherein one or both of the respective inerter rod (308) and the respective threaded shaft (322) extends at least substantially parallel to the inerter axis (306).

A21. The control surface actuator assembly (100) of any of paragraphs A19-A20, wherein the respective inerter rod (308) is hollow and defines a respective inerter rod bore (310).

A22. The control surface actuator assembly (100) of paragraph A21, wherein the respective shaft free end (324) is received within the respective inerter rod bore (310).

A23. The control surface actuator assembly (100) of any of paragraphs A19-A22, wherein the respective threaded shaft (322) is hollow and defines a respective shaft bore (323) that is open on the respective shaft free end (324) of the respective threaded shaft (322).

A24. The control surface actuator assembly (100) of paragraph A23, wherein the respective threaded shaft (322) includes one or more respective radial passages (325) extending radially from the respective shaft bore (323) to an exterior side of the respective threaded shaft (322) to allow fluid flow between the exterior side of the respective threaded shaft (322) and the respective shaft bore (323).

A25. The control surface actuator assembly (100) of any of paragraphs A19-A24, wherein each of the one or more inerters (300) further includes a respective flywheel (314) with a respective flywheel annulus (318) that is coupled to one or both of the respective inerter rod (308) and the respective threaded shaft (322); wherein the respective flywheel (314) is configured to rotate relative to the respective threaded shaft (322) with a rotational velocity that is proportional to a linear velocity at which the respective inerter rod (308) translates with respect to the respective threaded shaft (322).

A26. The control surface actuator assembly (100) of paragraph A25, wherein the respective flywheel annulus (318) is operatively coupled to one or more of the respective inerter rod (308), the respective threaded shaft (322), and the respective inerter housing (301).

A27. The control surface actuator assembly (100) of any of paragraphs A25-A26, wherein the respective flywheel (314) includes a respective flywheel bearing (328) at the respective flywheel annulus (318) to rotatably couple the respective flywheel (314) to at least one other component of the respective inerter (300).

A28. The control surface actuator assembly (100) of paragraph A27, wherein the respective flywheel bearing (328) is configured to permit the respective flywheel (314) to axially translate with the respective inerter rod (308) as the respective flywheel (314) rotates relative to the respective threaded shaft (322).

A29. The control surface actuator assembly (100) of any of paragraphs A19-A28, wherein one or both of the torque-generating hydraulic actuator (2110) and the VHR hydraulic actuator (1110) includes a respective inerter (300) of the one or more inerters (300).

A30. The control surface actuator assembly (100) of paragraph A29, wherein the respective hydraulic actuator housing (120) of one or both of the torque-generating hydraulic actuator (2110) and the VHR hydraulic actuator (1110) includes, and optionally is, the inerter housing (301) of the respective inerter (300).

A31. The control surface actuator assembly (100) of any of paragraphs A29-A30, wherein the respective rod (140) of one or both of the torque-generating hydraulic actuator (2110) and the VHR hydraulic actuator (1110) includes, and optionally is, the inerter rod (308) of the respective inerter (300).

A32. The control surface actuator assembly (100) of any of paragraphs A29-A31, wherein a/the respective flywheel (314) is rotatably coupled to the respective piston (142) of one or both of the torque-generating hydraulic actuator (2110) and the VHR hydraulic actuator (1110).

A33. The control surface actuator assembly (100) of any of paragraphs A19-A32, wherein at least one of the one or more inerters (300) includes a flexible holding structure (330) and a dual rack and pinion assembly (332) operatively supported by the flexible holding structure (330); wherein the dual rack and pinion assembly (332) includes:
(i) a pair of racks (334) including a first rack (334) and a second rack (334) positioned opposite each other and operatively supported by the flexible holding structure (330), each rack (334) having teeth; and
(ii) a pinion (336) positioned between and engaging the first and second racks (334);
wherein the pinion (336) includes gear teeth that engage the teeth of the first rack (334) and the second rack (334).

A34. The control surface actuator assembly (100) of paragraph A33, wherein the first terminal (302) is coupled to the first rack (334), and wherein the second terminal (304) is coupled to the second rack (334).

A35. The control surface actuator assembly (100) of any of paragraphs A33-A34, wherein the at least one of the one or more inerters (300) includes a pair of inertia wheels (340) respectively positioned adjacent to opposite exterior sides of the flexible holding structure (330).

A36. The control surface actuator assembly (100) of paragraph A35, wherein the at least one of the one or more inerters (300) further includes an axle element (342) extending through a first inertia wheel (340) of the pair of inertia wheels (340), the flexible holding structure (330), the pinion (336), and a second inertia wheel (340) of the pair of inertial wheels (340).

A37. The control surface actuator assembly (100) of any of paragraphs A35-A36, wherein relative movement of the first terminal (302) and the second terminal (304) causes translational movement of the first rack (334) relative to the second rack (334) along the inerter axis (306), thus causing rotational movement of the pinion (336) and the pair of inertia wheels (340) such that the rotational movement of the pinion (336) is resisted by the pair of inertia wheels (340).

A38. The control surface actuator assembly (100) of any of paragraphs A1-A37, wherein the respective hydraulic valve (200) of each of the torque-generating hydraulic actuator (2110) and the VHR hydraulic actuator (1110) includes:

a fluid input (242) configured to receive a high-pressure hydraulic fluid flow;

a fluid return (246) configured to discharge a low-pressure hydraulic fluid flow;

a first outlet (250) that is fluidly connected to a/the first chamber (124) of the respective hydraulic actuator housing (120);

a second outlet (252) that is fluidly connected to a/the second chamber (128) of the respective hydraulic actuator housing (120);

a spool manifold (204) that is selectively fluidly connected to two or more of the fluid input (242), the fluid return (246), the first outlet (250), and the second outlet (252);

a spool (210) positioned at least substantially within the spool manifold (204); wherein the spool includes a spool shaft (212) and one or more spool blocks (214) mounted on the spool shaft (212); and a spool actuator (216) configured to selectively translate the spool (210) relative to the spool manifold (204);

wherein the respective hydraulic valve (200) is configured such that translating the spool (210) relative to the spool manifold (204) operates to regulate a flow of the hydraulic fluid (81) between the fluid input (242), the fluid return (246), the first outlet (250), and the second outlet (252) to vary the pressure of the hydraulic fluid (81) within each of the first chamber (124) and the second chamber (128) of the respective hydraulic actuator housing (120) to translate the respective rod (140) relative to the respective hydraulic actuator housing (120).

A39. The control surface actuator assembly (100) of paragraph A38, wherein the spool actuator (216) includes at least one solenoid (218).

A40. The control surface actuator assembly (100) of any of paragraphs A38-A39, wherein the respective hydraulic valve (200) of one or both of the torque-generating hydraulic actuator (2110) and the VHR hydraulic actuator (1110) is a servo valve that includes a servo feedback system (230).

A41. The control surface actuator assembly (100) of any of paragraphs A38-A40, wherein one or both of the torque-generating hydraulic actuator (2110) and the VHR hydraulic actuator (1110) includes a respective piston position sensor (148) configured to generate a piston position measurement that represents a position of the respective piston (142) relative to the respective hydraulic actuator housing (120); and wherein the respective hydraulic valve (200) is configured to regulate the flow of hydraulic fluid (81) at least partially based upon the piston position measurement.

A42. The control surface actuator assembly (100) of any of paragraphs A38-A41, wherein the respective hydraulic valve (200) of one or both of the torque-generating hydraulic actuator (2110) and the VHR hydraulic actuator (1110) is a four-way three-position hydraulic valve (200).

A43. The control surface actuator assembly (100) of any of paragraphs A38-A42, wherein the respective hydraulic valve (200) of one or both of the torque-generating hydraulic actuator (2110) and the VHR hydraulic actuator (1110) is a dual-spool hydraulic valve (202).

A44. The control surface actuator assembly (100) of paragraph A43, wherein the spool manifold (204) is a first spool manifold (204); wherein the spool (210) of the dual-spool hydraulic valve (202) is a first spool (210) positioned at least substantially in the first spool manifold (204) with a respective first spool shaft (212) and a respective one or more first spool blocks (214); wherein the spool actuator (216) of the dual-spool hydraulic valve (202) is a first spool actuator (216) configured to selectively translate the first spool (210); and wherein the dual-spool hydraulic valve (202) further includes:

a second spool manifold (206) that is selectively fluidly connected to two or more of the fluid input (242), the fluid return (246), the first outlet (250), and the second outlet (252);

a second spool (220) positioned at least substantially within the second spool manifold (206); wherein the second spool (220) includes a respective second spool shaft (222) and a respective one or more second spool blocks (224) mounted on the second spool shaft (222); and a second spool actuator (226) configured to selectively translate the second spool (220) relative to the second spool manifold (206) and independent of the first spool (210);

wherein the dual-spool hydraulic valve (202) is configured such that translating the first spool (210) relative to the first spool manifold (204) and translating the second spool (220) relative to the second spool manifold (206) operates to regulate a flow of the hydraulic fluid (81) between the fluid input (242), the fluid return (246), the first outlet (250), and the second outlet (252) to vary the pressure of the hydraulic fluid (81) within each of the first chamber (124) and the second chamber (128) of the respective hydraulic actuator housing (120) to translate the respective rod (140) relative to the respective hydraulic actuator housing (120).

A45. The control surface actuator assembly (100) of any of paragraphs A43-A44, wherein the dual-spool hydraulic valve (202) is configured to enable fluid communication between the first outlet (250) and the second outlet (252).

A46. The control surface actuator assembly (100) of any of paragraphs A44-A45, wherein the dual-spool hydraulic valve (202) is configured such that the dual-spool hydraulic valve (202) remains functional to operatively translate the respective rod (140) relative to the respective hydraulic actuator housing (120) when one of the first spool actuator (216) and the second spool actuator (226) is disabled.

A47. The control surface actuator assembly (100) of any of paragraphs A44-A46, wherein the dual-spool hydraulic valve (202) further includes a fluid boost input (244) configured to receive a hydraulic fluid flow at a boost pressure that is higher than the pressure of the high-pressure hydraulic fluid flow.

A48. The control surface actuator assembly (100) of paragraph A47, wherein one or both of the first spool manifold (204) and the second spool manifold (206) is selectively fluidly connected to the fluid boost input (244).

A49. The control surface actuator assembly (100) of any of paragraphs A47-A48, wherein the respective hydraulic actuator housing (120) includes at least one pressure sensor (160) positioned in one or both of the first chamber (124) and the second chamber (128); wherein each pressure sensor (160) is configured to generate a pressure signal that indicates a pressure of the hydraulic fluid (81); and wherein the dual-spool hydraulic valve (202) is configured to selectively fluidly connect the fluid boost input (244) to one or both of the first outlet (250) and the second outlet (252) based, at least in part, on the pressure signal.

A50. The control surface actuator assembly (100) of any of paragraphs A44-A49, wherein one or both of the first spool shaft (212) and the second spool shaft (222) defines a shaft orifice (213) through which the hydraulic fluid (81) may flow.

A51. The control surface actuator assembly (100) of any of paragraphs A1-A50, wherein the flight control surface (20) is one or more of an aileron, a rudder, an elevator, a flap, a spoiler, and an air brake.

A52. The control surface actuator assembly (100) of any of paragraphs A1-A51, wherein the support structure (40) is a component of one or more of a wing, a horizontal stabilizer, and a vertical stabilizer.

B1. An aircraft hydraulic system (50) for operating one or more flight control surfaces (20) of an aircraft (10), the aircraft hydraulic system (50) comprising:

a fluid reservoir (60) containing a volume of hydraulic fluid (81);

one or more hydraulic pumps (52), each hydraulic pump (52) configured to pressurize the hydraulic fluid (81);

a plurality of hydraulic actuators (110), wherein one or more hydraulic actuators (110) of the plurality of hydraulic actuators (110) are configured to selectively pivot a respective flight control surface (20) of the one or more flight control surfaces (20); and a plurality of hydraulic conduits (80) configured to convey the hydraulic fluid (81) among components of the aircraft hydraulic system (50);

wherein at least one hydraulic actuator (110) of the plurality of hydraulic actuators (110) is the torque-generating hydraulic actuator (2110) of the control surface actuator assembly (100) of any of paragraphs A1-A52; and wherein at least one other hydraulic actuator (110) of the plurality of hydraulic actuators (110) is the VHR hydraulic actuator (1110) of the control surface actuator assembly (100) of any of paragraphs A1-A52.

B2. The aircraft hydraulic system (50) of paragraph B1, further comprising one or more accumulators (70) for maintaining a pressure of the hydraulic fluid (81).

B3. The aircraft hydraulic system (50) of any of paragraphs B1-B2, wherein the one or more hydraulic pumps (52) includes:

a central pump (54) configured to pressurize the hydraulic fluid (81) to a base pressure; and a boost pump (56) configured to pressurize the hydraulic fluid (81) to a/the boost pressure that is greater than the base pressure.

B4. The aircraft hydraulic system (50) of any of paragraphs B1-B3, wherein one or both of the base pressure and the boost pressure is one or more of at least 800 pounds per square inch (psi), at least 1000 psi, at least 1300 psi, at least 1500 psi, at least 2000 psi, at least 2500 psi, at least 3000 psi, at least 5000 psi, at least 10000 psi, at most 12000 psi, at most 7000 psi, at most 2700 psi, at most 2200 psi, at most 1700 psi, at most 1200 psi, and at most 900 psi.

B5. The aircraft hydraulic system (50) of any of paragraphs B3-B4, wherein the plurality of hydraulic conduits (80) includes:

(i) one or more supply lines (82) configured to convey the hydraulic fluid (81) at the base pressure;

(ii) one or more boost lines (84) configured to convey the hydraulic fluid (81) at the boost pressure; and (iii) one or more return lines (86) configured to convey the hydraulic fluid (81) at a pressure that is less than the base pressure.

B6. The aircraft hydraulic system (50) of any of paragraphs B3-B5, wherein the boost pump (56) supplies the hydraulic fluid flow to a/the fluid boost input (244) of a/the dual-spool hydraulic valve (202).

C1. An aircraft (10), comprising:

one or more flight control surfaces (20);

the control surface actuator assembly (100) of any of paragraphs A1-A52 for pivoting at least one of the one or more flight control surfaces (20); and the aircraft hydraulic system (50) of any of paragraphs B1-B6 for operating the control surface actuator assembly (100).

D1. A method (400) of operating the one or more flight control surfaces (20) of the aircraft (10) of paragraph C1, the method comprising:

controlling (420), with the control surface actuator assembly (100) and with the aircraft hydraulic system (50), a selected flight control surface (20) of the one or more flight control surfaces (20);

wherein the controlling the selected flight control surface (20) includes:

adjusting (422), with the VHR hydraulic actuator (1110), the actuator moment arm length (30) corresponding to the selected flight control surface (20); and pivoting (426), with the torque-generating hydraulic actuator (2110), the selected flight control surface (20) relative to the support structure (40).

D2. The method (400) of paragraph D1, wherein the adjusting (422) the actuator moment arm length (30) is performed prior to the pivoting (426) the selected flight control surface (20).

D3. The method (400) of any of paragraphs D1-D2, further comprising measuring (430), with a/the pressure sensor (160) positioned in one or both of a/the first chamber (124) and a/the second chamber (128) of the respective hydraulic actuator housing (120) of one or both of the torque-generating hydraulic actuator (2110) and the VHR hydraulic actuator (1110), a measured load pressure of the hydraulic fluid (81) within the respective hydraulic actuator housing (120).

D4. The method (400) of paragraph D3, further comprising adjusting (440), with the respective hydraulic valve (200) of one or both of the torque-generating hydraulic actuator (2110) and the VHR hydraulic actuator (1110), an operating pressure of the hydraulic fluid (81) within the respective hydraulic actuator housing (120) of the one or both of the torque-generating hydraulic actuator (2110) and the VHR hydraulic actuator (1110), wherein the adjusting (440) is based, at least in part, on the measured load pressure.

D5. The method (400) of any of paragraphs D1-D4, further comprising, prior to the adjusting (422) the actuator moment arm length (30), determining (410), with a controller (90), a target actuator moment arm length (30); and wherein the adjusting (422) the actuator moment arm length (30) includes, subsequent to the determining (410) the target actuator moment arm length (30), bringing (424) the actuator moment arm length (30) of the selected flight control surface (20) to the target actuator moment arm length (30).

D6. The method (400) of paragraph D5, wherein the determining (410) the target actuator moment arm length (30) is based, at least in part, on a machine learning algorithm.

D7. The method (400) of any of paragraphs D5-D6, wherein the determining (410) the target actuator moment arm length (30) is based, at least in part, on an anticipated maneuver of the aircraft (10).

D8. The method (400) of any of paragraphs D5-D7, when dependent from paragraph D3, wherein the determining (410) the target actuator moment arm length (30) is based, at least in part, on the measuring (430) the measured load pressure.

D9. The method (400) of any of paragraphs D5-D8, wherein the determining (410) the target actuator moment arm length (30) includes determining a value of the target actuator moment arm length (30) that will bring a load pressure of the hydraulic fluid (81) within the respective hydraulic actuator housing (120) at least substantially to a target load pressure.

D10. The method (400) of paragraph D9, wherein the aircraft (10) includes a plurality of flight control surfaces (20); wherein the control surface actuator assembly (100) is one of a corresponding plurality of control surface actuator assemblies (100); and wherein the target load pressure corresponds to a measured load pressure of the hydraulic fluid (81) within the respective hydraulic actuator housing (120) of one or both of the respective torque-generating hydraulic actuator (2110) and the respective VHR hydraulic actuator (1110) of at least one other control surface actuator assembly (100) of the plurality of control surface actuator assemblies (100).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A control surface actuator assembly comprising:
   a support structure;
   a flight control surface operatively coupled to the support structure and configured to pivot relative to the support structure about a control surface pivot axis;
   a torque-generating hydraulic actuator; and
   a variable horn radius (VHR) hydraulic actuator pivotally coupled to the torque-generating hydraulic actuator and operatively coupled to the flight control surface;
   wherein each of the torque-generating hydraulic actuator and the VHR hydraulic actuator includes:
   a respective hydraulic actuator housing and a respective rod that extends at least partially into the respective hydraulic actuator housing, wherein the respective rod is configured to translate relative to the respective hydraulic actuator housing along a respective actuator axis; and
   a respective hydraulic valve that regulates a flow of hydraulic fluid relative to the respective hydraulic actuator housing to control a position of the respective rod relative to the respective hydraulic actuator housing;
   wherein the torque-generating hydraulic actuator and the VHR hydraulic actuator are configured to pivot relative to one another about an actuator coupling axis; wherein the torque-generating hydraulic actuator is configured to apply a torque to the flight control surface to pivot the flight control surface relative to the support structure; and wherein the VHR hydraulic actuator is configured to selectively vary an actuator moment arm length, as measured between the control surface pivot axis and the actuator coupling axis, to at least partially regulate the torque applied to the flight control surface by the torque-generating hydraulic actuator;
   wherein the respective hydraulic valve of one or both of the torque-generating hydraulic actuator and the VHR hydraulic actuator is a dual-spool hydraulic valve;
   wherein the dual-spool hydraulic valve includes:
   a fluid input configured to receive a high-pressure hydraulic fluid flow;
   a fluid boost input configured to receive a hydraulic fluid flow at a boost pressure that is higher than a pressure of the high-pressure hydraulic fluid flow;
   a fluid return configured to discharge a low-pressure hydraulic fluid flow;
   a first outlet that is fluidly connected to a first chamber of the respective hydraulic actuator housing;
   a second outlet that is fluidly connected to a second chamber of the respective hydraulic actuator housing;
   a first spool manifold that is selectively fluidly connected to two or more of the fluid input, the fluid boost input, the fluid return, the first outlet, and the second outlet;
   a second spool manifold that is selectively fluidly connected to two or more of the fluid input, the fluid boost input, the fluid return, the first outlet, and the second outlet;
   a first spool positioned at least substantially within the first spool manifold; wherein the first spool includes a respective first spool shaft and a respective one or more first spool blocks mounted on the first spool shaft; and
   a second spool positioned at least substantially within the second spool manifold; wherein the second spool includes a respective second spool shaft and a respective one or more second spool blocks mounted on the second spool shaft;
   a first spool actuator configured to selectively translate the first spool relative to the first spool manifold; and
   a second spool actuator configured to selectively translate the second spool relative to the second spool manifold and independent of the first spool; and
   wherein the respective hydraulic valve is configured such that translating the first spool relative to the first spool manifold and translating the second spool relative to the second spool manifold operates to regulate a flow of the hydraulic fluid between the fluid input, the fluid boost input, the fluid return, the first outlet, and the second outlet to vary a pressure of the hydraulic fluid within each of the first chamber and the second chamber of the respective hydraulic actuator housing to translate the respective rod relative to the respective hydraulic actuator housing.

2. The control surface actuator assembly of claim 1, wherein the VHR hydraulic actuator is configured to selectively vary the actuator moment arm length among a range of values defined between and including a minimum actuator moment arm length and a maximum actuator moment arm length, and wherein the maximum actuator moment arm length is at least 1.5 times the minimum actuator moment arm length.

3. The control surface actuator assembly of claim 1, wherein the respective hydraulic actuator housing of one or both of the torque-generating hydraulic actuator and the VHR hydraulic actuator includes an inerter that is configured to resist an acceleration of the respective rod relative to the respective hydraulic actuator housing.

4. The control surface actuator assembly of claim 1, wherein the respective hydraulic valve of one or both of the torque-generating hydraulic actuator and the VHR hydraulic actuator is a four-way three-position hydraulic valve.

5. The control surface actuator assembly of claim 1, wherein the dual-spool hydraulic valve is configured to enable fluid communication between the first outlet and the second outlet.

6. The control surface actuator assembly of claim 1, wherein the respective hydraulic actuator housing includes at least one pressure sensor positioned in one or both of the first chamber and the second chamber; wherein each pressure sensor is configured to generate a pressure signal that indicates a pressure of the hydraulic fluid; and wherein the dual-spool hydraulic valve is configured to selectively fluidly connect the fluid boost input to one or both of the first outlet and the second outlet based, at least in part, on the pressure signal.

7. The control surface actuator assembly of claim 1, wherein the flight control surface is one or more of an aileron, a rudder, an elevator, a flap, a spoiler, and an air brake.

8. The control surface actuator assembly of claim 1, wherein the support structure includes one or more of a wing, a horizontal stabilizer, and a vertical stabilizer.

9. An aircraft, comprising:
one or more flight control surfaces;
the control surface actuator assembly of claim 1 for pivoting at least one of the one or more flight control surfaces; and
an aircraft hydraulic system for operating the control surface actuator assembly.

10. A method of operating the one or more flight control surfaces of the aircraft of claim 9, the method comprising:
controlling, with the control surface actuator assembly and with the aircraft hydraulic system, a selected flight control surface of the one or more flight control surfaces;
wherein the controlling the selected flight control surface includes:
adjusting, with the VHR hydraulic actuator, the actuator moment arm length corresponding to the selected flight control surface; and
pivoting, with the torque-generating hydraulic actuator, the selected flight control surface relative to the support structure.

11. The method of claim 10, wherein the adjusting the actuator moment arm length is performed prior to the pivoting the selected flight control surface.

12. The method of claim 10, further comprising, prior to the adjusting the actuator moment arm length, determining, with a controller, a target actuator moment arm length; and wherein the adjusting the actuator moment arm length includes, subsequent to the determining the target actuator moment arm length, bringing the actuator moment arm length of the selected flight control surface to the target actuator moment arm length.

13. The method of claim 12, wherein the determining the target actuator moment arm length is based, at least in part, on a machine learning algorithm.

14. The method of claim 12, wherein the determining the target actuator moment arm length is based, at least in part, on an anticipated maneuver of the aircraft.

15. The method of claim 12, wherein the determining the target actuator moment arm length includes determining a value of the target actuator moment arm length that will bring a load pressure of the hydraulic fluid within one or both of a first chamber and a second chamber of the respective hydraulic actuator housing of one or both of the torque-generating hydraulic actuator and the VHR hydraulic actuator at least substantially to a target load pressure.

16. An aircraft hydraulic system for operating one or more flight control surfaces of an aircraft, the aircraft hydraulic system comprising:
a fluid reservoir containing a volume of hydraulic fluid;
one or more hydraulic pumps, each hydraulic pump configured to pressurize the hydraulic fluid;
a plurality of hydraulic actuators; wherein one or more hydraulic actuators of the plurality of hydraulic actuators are configured to selectively pivot a respective flight control surface of the one or more flight control surfaces; and
a plurality of hydraulic conduits configured to convey the hydraulic fluid among components of the aircraft hydraulic system;
wherein at least one hydraulic actuator of the plurality of hydraulic actuators is a torque-generating hydraulic actuator and at least one other hydraulic actuator of the plurality of hydraulic actuators is a VHR hydraulic actuator;
wherein each of the torque-generating hydraulic actuator and the VHR hydraulic actuator includes:
a respective hydraulic actuator housing and a respective rod that extends at least partially into the respective hydraulic actuator housing, wherein the respective rod is configured to translate relative to the respective hydraulic actuator housing along a respective actuator axis; and
a respective hydraulic valve that regulates a flow of the hydraulic fluid relative to the respective hydraulic actuator housing to control a position of the respective rod relative to the respective hydraulic actuator housing;
wherein the torque-generating hydraulic actuator and the VHR hydraulic actuator are configured to pivot relative to one another about an actuator coupling axis; wherein the torque-generating hydraulic actuator is configured to apply a torque to the respective flight control surface to pivot the respective flight control surface relative to a support structure; and wherein the VHR hydraulic actuator is configured to selectively vary an actuator moment arm length, as measured between a control surface pivot axis and the actuator coupling axis, to at least partially regulate the torque applied to the respective flight control surface by the torque-generating hydraulic actuator;

wherein the one or more hydraulic pumps includes:
a central pump configured to pressurize the hydraulic fluid to a base pressure; and
a boost pump configured to pressurize the hydraulic fluid to a boost pressure that is greater than the base pressure; and
wherein the boost pump supplies a hydraulic fluid flow to a fluid boost input of a dual-spool hydraulic valve.

17. An aircraft, comprising:
one or more flight control surfaces;
a control surface actuator assembly for pivoting at least one of the one or more flight control surfaces; and
the aircraft hydraulic system of claim 16 for operating the control surface actuator assembly.

18. A method of operating one or more flight control surfaces of an aircraft that comprises a control surface actuator assembly comprising (i) a support structure; (ii) a flight control surface operatively coupled to the support structure and configured to pivot relative to the support structure about a control surface pivot axis; (iii) a torque-generating hydraulic actuator; (iv) a variable horn radius (VHR) hydraulic actuator pivotally coupled to the torque-generating hydraulic actuator and operatively coupled to the flight control surface; wherein each of the torque-generating hydraulic actuator and the VHR hydraulic actuator includes (a) a respective hydraulic actuator housing and a respective rod that extends at least partially into the respective hydraulic actuator housing, wherein the respective rod is configured to translate relative to the respective hydraulic actuator housing along a respective actuator axis; and (b) a respective hydraulic valve that regulates a flow of hydraulic fluid relative to the respective hydraulic actuator housing to control a position of the respective rod relative to the respective hydraulic actuator housing; and (v) an aircraft hydraulic system for operating the control surface actuator assembly; wherein the torque-generating hydraulic actuator and the VHR hydraulic actuator are configured to pivot relative to one another about an actuator coupling axis; wherein the torque-generating hydraulic actuator is configured to apply a torque to the flight control surface to pivot the flight control surface relative to the support structure; and wherein the VHR hydraulic actuator is configured to selectively vary an actuator moment arm length, as measured between the control surface pivot axis and the actuator coupling axis, to at least partially regulate the torque applied to the flight control surface by the torque-generating hydraulic actuator; the method comprising:
controlling, with the control surface actuator assembly and with the aircraft hydraulic system, a selected flight control surface of the one or more flight control surfaces, wherein the controlling the selected flight control surface includes:
adjusting, with the VHR hydraulic actuator, the actuator moment arm length corresponding to the selected flight control surface; and
pivoting, with the torque-generating hydraulic actuator, the selected flight control surface relative to the support structure;
measuring, with a pressure sensor positioned in one or both of a first chamber and a second chamber of the respective hydraulic actuator housing of one or both of the torque-generating hydraulic actuator and the VHR hydraulic actuator, a measured load pressure of the hydraulic fluid within the respective hydraulic actuator housing; and
adjusting, with the respective hydraulic valve of one or both of the torque-generating hydraulic actuator and the VHR hydraulic actuator, an operating pressure of the hydraulic fluid within the respective hydraulic actuator housing of the one or both of the torque-generating hydraulic actuator and the VHR hydraulic actuator;
wherein the adjusting is based, at least in part, on the measured load pressure.

19. The method of claim 18, wherein the adjusting the actuator moment arm length is performed prior to the pivoting the selected flight control surface.

20. The method of claim 18, further comprising, prior to the adjusting the actuator moment arm length, determining, with a controller, a target actuator moment arm length; and wherein the adjusting the actuator moment arm length includes, subsequent to the determining the target actuator moment arm length, bringing the actuator moment arm length of the selected flight control surface to the target actuator moment arm length.

* * * * *